(12) United States Patent
Hurst et al.

(10) Patent No.: US 10,189,519 B2
(45) Date of Patent: Jan. 29, 2019

(54) LEG CONFIGURATION FOR SPRING-MASS LEGGED LOCOMOTION

(71) Applicant: Oregon State University, Corvallis, OR (US)

(72) Inventors: Jonathan Hurst, Albany, OR (US); Mikhail Sobiegraj Jones, Corvallis, OR (US); Andrew Martin Abate, Corvallis, OR (US)

(73) Assignee: OREGON STATE UNIVERSITY, Corvallis, OR (US)

( * ) Notice: Subject to any disclaimer, the term of this patent is extended or adjusted under 35 U.S.C. 154(b) by 244 days.

(21) Appl. No.: 15/166,517

(22) Filed: May 27, 2016

(65) Prior Publication Data

US 2016/0347387 A1 Dec. 1, 2016

Related U.S. Application Data

(60) Provisional application No. 62/167,953, filed on May 29, 2015.

(51) Int. Cl.
*B62D 57/032* (2006.01)
*B62D 57/02* (2006.01)

(52) U.S. Cl.
CPC ........... *B62D 57/032* (2013.01); *B62D 57/02* (2013.01); *Y10S 901/01* (2013.01)

(58) Field of Classification Search
CPC ...... B62D 57/02; B62D 57/032; Y10S 901/01
See application file for complete search history.

(56) References Cited

U.S. PATENT DOCUMENTS

| 4,511,011 A | * | 4/1985 | Bartholet | B62D 57/02 180/8.6 |
|---|---|---|---|---|
| 4,662,465 A | * | 5/1987 | Stewart | B62D 57/02 180/8.1 |
| 5,650,704 A | | 7/1997 | Pratt | |
| 6,109,378 A | * | 8/2000 | Paakkunainen | B62D 57/032 180/8.5 |
| 6,243,624 B1 | | 6/2001 | Wu | |
| 6,532,400 B1 | * | 3/2003 | Jacobs | B25J 9/1075 318/568.11 |
| 6,620,021 B2 | * | 9/2003 | Liu | A63H 3/20 446/294 |
| 6,658,962 B1 | * | 12/2003 | Rosheim | B25J 15/0009 74/490.05 |
| 7,111,696 B2 | * | 9/2006 | Miyazaki | B25J 9/102 180/8.1 |
| 7,734,375 B2 | | 6/2010 | Buehler | |
| 8,237,390 B2 | * | 8/2012 | Godler | B25J 9/126 318/560 |

(Continued)

OTHER PUBLICATIONS

"A View on Machine Vision", Packaging Magazine, Packaging, Techpages, p. 26-27, Jul. 2008.

(Continued)

*Primary Examiner* — Joseph M Rocca
*Assistant Examiner* — Maurice L Williams
(74) *Attorney, Agent, or Firm* — Niels Haun; Dann, Dorfman, Herrell & Skillman, P.C.

(57) ABSTRACT

Devices and methods for legged locomotion, including a robotic leg for spring-mass legged locomotion incorporating passive dynamics.

23 Claims, 19 Drawing Sheets

(56) References Cited

U.S. PATENT DOCUMENTS

| | | | | |
|---|---|---|---|---|
| 8,551,184 | B1* | 10/2013 | Herr | A61F 2/66 623/24 |
| 8,914,151 | B2 | 12/2014 | Hurst | |
| 9,283,673 | B2* | 3/2016 | Godowski | B25J 9/106 |
| 9,297,442 | B1* | 3/2016 | Piercy | F16H 1/32 |
| 9,333,097 | B2* | 5/2016 | Herr | A61F 2/60 |
| 9,400,035 | B1* | 7/2016 | Edsinger | F16H 1/32 |
| 9,423,608 | B2* | 8/2016 | Doyle | G02B 7/1821 |
| 9,789,920 | B2* | 10/2017 | Hurst | B62D 57/032 |
| 2003/0093021 | A1* | 5/2003 | Goffer | A61F 5/0102 602/23 |
| 2004/0133307 | A1* | 7/2004 | Lee | B25J 9/1065 700/245 |
| 2006/0069448 | A1* | 3/2006 | Yasui | A61F 2/60 623/24 |
| 2007/0162152 | A1* | 7/2007 | Herr | A61F 2/60 623/24 |
| 2008/0203955 | A1* | 8/2008 | Gomi | B25J 9/1065 318/568.12 |
| 2008/0210477 | A1* | 9/2008 | Takenaka | B25J 19/0012 180/8.6 |
| 2009/0001919 | A1* | 1/2009 | Tsusaka | A63H 11/18 318/568.12 |
| 2009/0038421 | A1* | 2/2009 | Wilson | B25J 9/102 74/33 |
| 2010/0222927 | A1* | 9/2010 | Zaier | B62D 57/032 700/254 |
| 2010/0243344 | A1* | 9/2010 | Wyrobek | B25J 5/007 180/21 |
| 2010/0324699 | A1* | 12/2010 | Herr | A61F 2/66 623/27 |
| 2011/0297461 | A1* | 12/2011 | Miyazaki | A63H 11/00 180/8.6 |
| 2012/0072026 | A1* | 3/2012 | Takagi | B25J 9/1075 700/261 |
| 2013/0054021 | A1* | 2/2013 | Murai | G06N 3/008 700/245 |
| 2013/0116820 | A1* | 5/2013 | Lee | B62D 57/032 700/254 |
| 2013/0152724 | A1* | 6/2013 | Mozeika | B25J 17/00 74/490.05 |
| 2013/0310979 | A1* | 11/2013 | Herr | B25J 9/1694 700/258 |
| 2014/0188279 | A1* | 7/2014 | Lee | B25J 9/1607 700/263 |
| 2014/0188280 | A1* | 7/2014 | Lee | B25J 9/1607 700/263 |
| 2014/0190289 | A1* | 7/2014 | Zhu | B25J 9/104 74/89.22 |
| 2015/0073592 | A1* | 3/2015 | Kaneko | B62D 57/024 700/245 |
| 2015/0122559 | A1* | 5/2015 | Nagatsuka | B25J 9/1065 180/8.6 |
| 2015/0216681 | A1* | 8/2015 | Lipsey | A61F 2/582 623/60 |
| 2016/0023699 | A1* | 1/2016 | Saunders | G05D 16/2006 180/8.6 |
| 2016/0199978 | A1* | 7/2016 | Garrec | B25J 9/0006 74/490.03 |

OTHER PUBLICATIONS

"Faster Processing, Faster Payback", Packaging Magazine, Techpages, p. 25, Jul. 2008.
Ahmadi, M, et al., "Controlled passive dynamic running experiments with the arl-monopod ii," IEEE Transactions on Robotics, vol. 22, pp. 974-986, Oct. 2006.
Ahmadi, M., et al., "A control strategy for stable passive running", in IEEE Conf. on Intelligent Systems and Robots, pp. 152-157,1995.
Blickhan, R., "The Spring-Mass Model for Running and Hopping," J. of Biomech., vol. 22, pp. 1217-1227, 1989.
Cavagna, G., "Storage and utilization of elastic energy in skeletal muscle," Exercise Sports Science, vol. 5, pp. 89-129, 1977.
Collins, S., et al., "A Bipedal Walking Robot with Efficient and Human-Like Gait*", International Conference on Robotics and Automation, Barcelona, Spain, Apr. 2005, pp. 1983-1988.
Collins, S., et al., "Efficient Bipedal Robots Based on Passive-Dynamic Walkers", Feb. 18, 2005, vol. 307, Science, pp. 1082-1085.
Daley, M, et al., "Running over rough terrain: Guinea fowl maintain dynamic stability despite a large unexpected change in substrate height," The Journal of Experimental Biology, vol. 209, pp. 171-187, 2006.
Ernst, M, et al. "Spring-legged locomotion on uneven ground: a control approach to keep the running speed constant" in Proc 12th Int Conf on Climbing and walking Robots (CLAWAR), 2009.
Farley, C., et al., "Mechanism of Leg Stiffness Adjustment for Hopping on Surfaces of Different Stiffness", American Physiological Society, pp. 1044-1055, 1998.
Ferris, D., et al., "Interaction of Leg Stiffness and Surface Stiffness During Human Hopping", 1997 the American Physiological Society, pp. 15-22.
Hubicki, C., "Adjustable-Compliance Legs. Why Bother?", 4 pages, Jun. 14, 2012.
Hurst, J., et al., "An Actuator with Physically Variable Stiffness for Highly Dynamic Legged Locomotion", International Conf. on Robotics and Automation, New Orleans, LA Apr. 26-May 1, 2004.
Kemper, K., et al., "Optimal Passive Dynamic for Torque/Force Control", International Conference on Robotics and Automation, Sep. 15, 2010, 6 pages.
Koepl, D., et al., "Force Control for Planar Spring-Mass Running" in Intelligent Robots and Systems (IROS), 2011 IEEE/RSJ International Conference Ligent Robots and Systems (IROS), 2011 IEEE/RSJ International Conference.
Koepl, D., et al., "Force Control for Spring-Mass Walking and Running" in Advanced Intelligent Mechatronics (AIM), 2010 IEEE/ASME International Conference on, Jul. 8, 2010.
McGuigan, M, et al., "The Effect of Gait and Digital Flexor Muscle Activation on Limb Compliance in the Forelimb of the Horse *Equus caballus*", The Journal of Experimental Biology 206, pp. 1325-1336, 2003, The Company of Biologists Ltd.
McGuigan, M., et al., "Horse's Leg Set to Spring", \pogo stick\ horse legs need better track surfaces, Journal of Experimental Biology, vol. 206, p. 1261, 2003.
Pratt, G., et al., "Series Elastic Actuators" in IEEE International Conference on Intelligent Robots and Systems, vol. 1, pp. 399-406, 1995.
Pratt, J., et al., "Exploiting Natural Dynamics in the Control of a Planar Bipedal Walking Robot", Proceedings of the Thirty-Sixth Annual Allerton Conference on Communication, Control, and Computing, Monticello, Illinois, Sep. 1998.
Raibert, M., et al., "BigDog, the Rough-Terrain Quadruped Robot", Proceedings of the 17th World Congress, The International Federation of Automatic Control, Seoul, Korea, Jul. 6-11, 2008, pp. 10822-10825 .
Robinson, D., et al., "Series Elastic Actuator Development for a Biomimetic Walking Robot", ASME Int'l Conf on Adv. Intelligent Mechatronics, Sep. 19-22, 1999.
Seyfarth, A., et al., "Natural Control of Spring-Like Running: Optimised Selfstablisation" In CLAWAR, 2002.
Seyfarth, A., et al., "Swing-leg Retraction: A Simple Cotnrol Model for Stable Running", The Journal of Experimental Biology 206, 2547-2555, 2003, The Company of Biologists Ltd.
Sreenath, K., et al., "A Compliant Hybrid Zero Dynamics Controller for Stable, Efficient and Fast Bipedal Walking on MABEL", Int. J. Rob. Res. 30, 1170 (Aug. 2011).
Tello, E., Review of "Legged Robots that Balance" by M. Raibert, p. 89, 1986.
"Healthy Production Healthy Profit", Packaging Magazine, Packaging, Trends, p. 20-21, Jul. 2008.
Collins, S., et al., "A 3-d passive dynamic walking robot with two legs and knees," International Journal of Robotics Research, vol. 20, pp. 607-615, 2001.

(56) References Cited

OTHER PUBLICATIONS

Geyer, H., et al., "Spring-mass running: Simple approximate solution and application to gait stability," Journal of Theoretical Biology, vol. 232, p. 315-328, 2005.
Grimes, J.A., et al., "The Design of Atrias 1.0 a Unique Monopod, Hopping Robot", Apr. 9, 2012, WSPC—Proceedings Trim Size: 9in x 6in, pp. 1-7.
Verrelst, B., et al., "Novel robotic applications using adaptable compliant actuation. an implementation towards reduction of energy consumption for legged robots," Mobile Robots, Moving Intelligence, pp. 513-534, Dec. 2006.
A. Sprowitz, A. Tuleu, M. Vespignani, M. Ajallooeian, E. Badri, and A. J. Ijspeert, "Towards dynamic trot gait locomotion: Design, control, and experiments with cheetah-cub, a compliant quadruped robot," The International Journal of Robotics Research, vol. 32, No. 8, pp. 932-950, 2013.
B. Andrews, B. Miller, J. Schmitt, and J. E. Clark, "Running over unknown rough terrain with a one-legged planar robot," 2011.
B. Brown and G. Zeglin, "The bow leg hopping robot," in Proceedings. IEEE International Conference on Robotics and Automation, 1998., vol. 1, 1998, pp. 781-786 vol. 1.
G. Zeglin and H. B. Brown. "Control of a bow leg hopping robot." In IEEE International Conference on Robotics and Automation, May 1998.
H. Geyer, A. Seyfarth, and R. Blickhan. "Compliant leg behaviour explains basic dynamics of walking and running." Proceedings of the Royal Society B-Biological Sciences, 273 (1603):2861-2867, 2006.
H. Geyer, R. Blickhan, and A. Seyfarth, "Natural dynamics of spring-like running: Emergence of selfstability," in 5th International Conference on Climbing and Walking Robots, vol. 92, 2002.
Hubicki, C. et al., "ATRIAS: Enabling Bipedal Agility and Efficiency with a3D-Capable Spring-Mass Robot Design,".
J. D. G. Kooijman et al., "A bicycle can be self-stable without gyroscopic or caster effects." Science Magazine, Apr. 15, 2011 2011.
J. P. Meijaard et al., . "Linearized dynamic equations for the balance and steer of a bicycle: a benchmark and review." Proceedings of the Royal Society A, 463:1955-1982, 2007.
J. Schmitt, M. Garcia, R. C. Razo, P. Holmes, and R. J. Full, "Dynamics and stability of legged locomotion in the horizontal plane: a test case using insects," 2002.
J. W. Hurst, "The electric cable differential leg: a novel design approach for walking and running," 2011.
J.W. Grizzle, et al., "MABEL, A New Robotic Bipedal Walker and Runner," 2009 American Control Conference, Hyatt Regency Riverfront, St. Louis, MO, USA, Jun. 10-12, 2009.
K. Papantoniou, "Electromechanical design for an electrically powered, actively balanced one leg planar robot," in IEEE/RSJ International Workshop on Intelligent Robots and Systems \91. \Intelligence for Mechanical Systems, Proceedings IROS \91, 1991, pp. 1553-1560 vol. 3.
M. A. Daley, "Biomechanics: Running over uneven terrain is a no-brainer," Current Biology, vol. 18, No. 22, pp. R1064-R1066, 2008.
M. H. Raibert, H. B. Brown, and M. Chepponis, "Experiments in balance with a 3d one-legged hopping machine," The International Journal of Robotics Research, vol. 3, No. 2, pp. 75-92, 1984.
M. Wisse and A. Schwab. "Skateboards, bicycles, and three-dimensional biped walking machines: Velocity-dependent stability by means of lean-to-yaw coupling." The International Journal of Robotics Research, 24:417-429, 2005.
P. A. Bhounsule, J. Cortell, and A. Ruina, "Design and control of ranger: an energy-efficient, dynamic walking robot," in Proc. CLAWAR, 2012, pp. 441-448.
R. Blickhan, A. Seyfarth, H. Geyer, S. Grimmer, H. Wagner, and M. Günther, "Intelligence by mechanics," Phil. Trans. R. Soc. A, vol. 365, No. 1850, pp. 199-220, 2007.
R. M. Alexander, "Tendon elasticity and muscle function," 2002.
S. Gatesy, R. Kambic, and T. J. Roberts. "Long-axis rotation (lar): a missing degree of freedom in avian bipedal locomotion." In Proceedings of the 2012 Dynamic Walking Conference, 2012.
S. Hyon and T. Mita, "Development of a biologically inspired hopping robot-"kenken"," in IEEE International Conference on Robotics and Automation, 2002. Proceedings. ICRA \02, vol. 4, 2002, pp. 3984-3991 vol. 4.
T. M. Kubow and R. J. Full. "The role of the mechanical system in control; a hypothesis of self stabilization in hexapedal runners." Phil. Trans. R. Soc. Lond., 1999.
T. McGeer, "Passive dynamic walking," The International Journal of Robotics Research, vol. 9, No. 2, pp. 62-82, 1990.
Mazumda et al.; 2015 IEEE International Conference on Robotics and Automation; May 26-30, 2015; pp. 835-841.
Lanigan et al.; Sandia National Laboratories News; Mar. 2017; pp. 1-16.

\* cited by examiner

LEG CONFIGURATION FOR SPRING-MASS LEGGED LOCOMOTION

RELATED APPLICATIONS

This application claims the benefit of priority of U.S. Provisional Application No. 62/167,953, filed on May 29, 2015, the entire contents of which application(s) are incorporated herein by reference.

GOVERNMENT LICENSE RIGHTS

This invention was made with government support under contract number W91CRB-11-1-0002 awarded by the Defense Advanced Research Projects Agency (DARPA). The government has certain rights in the invention.

FIELD OF THE INVENTION

The present invention relates generally to devices and methods for legged locomotion, including a robotic leg for spring-mass legged locomotion incorporating passive dynamics.

BACKGROUND OF THE INVENTION

Humans and other animals have the remarkable ability to negotiate an unknown and changing environment, not only without falling, but also with a level of efficiency currently unmatched in existing robotic systems. Literature suggests that a large portion of this agility may be due to the natural behavior of the animal's body in addition to neurological feedback control. Morphology and materials of limbs (their mass, elasticity of tendons, lever arms between joints, etc.) can enable efficient and immediate feedback control and stabilization at the hardware level. Using this hardware-in-the-loop control premise, natural looking walking and running gaits can emerge from the "natural" ("free" or "passive") dynamics of the mechanism.

Passive dynamics exist for any physical system, whether premeditated or not, and whether favorable or detrimental to the task at hand. For highly dynamic behaviors, with large accelerations, impacts, and/or energy transfers, passive dynamics can significantly affect the performance. Very high bandwidth, high power actuators, such as those in hydraulic machines, are sometimes capable of overcoming unfavorable passive dynamics and exhibiting highly dynamic behavior, but they do so at the cost of extremely high power requirements. Designing systems with appropriate passive dynamics can greatly simplify the active control system, permit low-bandwidth actuation, and minimize energy costs. However, utilizing passive dynamics also constrains the behavior of the system to only those dynamics embodied by hardware, and cannot change without morphological changes. As such, machines that focus exclusively or extensively on passive dynamics rather than computer control will have only a single behavior, such as a single gait at a single speed on flat ground, and may be very susceptible to disturbances such as small bumps in the ground.

In one existing approach to legged locomotion, robustness and agility may be obtained by minimizing the effect of passive dynamics as much as possible, and utilizing hydraulic actuators with sufficiently high bandwidth to generate almost entirely computer control-defined dynamic behaviors. Hydraulics have the benefit of high force generation and very fast response times with a small and lightweight cylinder, allowing the cylinders to be mounted directly on lightweight, strong robot legs. However, there are several drawbacks: first, any motion takes the same amount of power regardless of the load placed on the actuator, because cylinder displacement results in fluid displacement from the high pressure side (pumped) of the system to the low pressure (collected) side of the system. This effect can lead to very energetically wasteful motions if the actuators are moving without significant loading, such as during leg swing retraction. Second, a hydraulic pump, hydraulic lines, and cylinders add significant complexity throughout a machine such as a legged robot. While excellence in engineering makes it possible, fluid leaks and regular maintenance are common in existing state of the art systems.

For existing state of the art hydraulic systems, leg springs are not used and thus gait energy is not stored during stance and liftoff. High-bandwidth and high-power hydraulic actuation allows the dynamic behavior to be controlled, but at a cost: all negative power done by the leg is dissipated as heat, and all positive power must be generated by the actuators. The benefit of such a design choice is greater flexibility in gait development due to nearly direct computer control of leg dynamics, but the price is vastly wasteful energy use. Thus, while the specialized hydraulic actuators are capable of this unnecessary challenge, there is an unavoidable cost of very low efficiency. Hence there remains a need in the art for improved devices and methods for legged robotic locomotion.

SUMMARY OF THE INVENTION

In one of its aspects, the present invention relates to a leg configuration for an agile, operationally robust, electrically-actuated bipedal robot, in which the design may be approached as a complete leg system, not merely an individual "widget" that may be placed on any device. As such, components of the present invention, such as leg drives, transmissions, and springs, may be integrated to generate an appropriate spring function, inertia matrix on impact, torque application, and minimization of internal mechanical work and power loops. Transmissions may be linkages, cable drives, harmonic transmissions, cycloid transmissions, gears, and so forth which may achieve appropriate transmission ratios and torque densities, very high transmission efficiency, and little to no backlash, enabling precise motion control. Devices of the present invention may provide a minimum of transmission components while isolating mass and inertia from ground impacts using springs, and using a single motor for leg length and a single motor for leg angle to control all motions and ground interactions in the forward-backward direction, for example.

For instance, in another of its aspects, the present invention may include a leg configuration of a bipedal robot which may be suitable for walking and running at human speeds over terrain of the same roughness and variation that a human or other large bipedal animal can negotiate. The leg may be configured to have: (1) at least three independent leg links (first, second, third) connected to each other with joints that have rotational freedom; (2) a first actuator (e.g., a motor) mounted on a body of the robot to a gimbal, used primarily for leg angle control; (3) a second actuator (e.g., a motor) mounted on the first leg link, which is closest to the body, used primarily for leg length control; (4) springs connected to the second and third leg links, to isolate the leg actuators and other massy objects on the first link from ground impact (i.e., the first link, where the second actuator is mounted, does not move on ground impact, avoiding an impulse that can damage leg components and sap energy from the gait). (As used herein, the term "mounted" "to"/ "at"/"on" includes both directly mounted or indirectly mounted via one or more intermediate components.) The leg may also be configured to move in the adduction/abduction and yaw directions, for example by including gimbal actuators mounted between the robot body and the first actuator at the first end of the first link, or by allowing rotation along the link axis in the second and third leg links to allow for both yaw and adduction/abduction of the leg without movement of the massive actuators.

The use of mechanical leg springs as a core component of walking dynamics may also represent a significant feature of the present invention. Three reasons to use springs may include:

(1) Power—springs can reduce the power requirements of actuators in spring-mass walking and running gaits. Physical springs can be very effective, more effective than motors, at applying very high forces at very high speeds, for short periods of time.

(2) Efficiency—energy cycles in and out of a spring during a walking or running gait, and physical springs are better able to store and release energy than the motor, transmission, and motor power electronics (or hydraulic infrastructure in case of hydraulic actuators). Spring restitutions can be as high as 97%.

(3) Impacts—ground impacts on toe contact are an inelastic collision, and as such, any inertia associated with the impact can cause significant force impulses, and significant energy loss. Springs can isolate the actuators, motors, and robot mass from the collision. Few actuators have sufficiently high bandwidth to simulate this effect. Thus, devices of the present invention may follow a more biologically similar path, that of using the passive dynamics of the mechanism (inherent inertias, physical springs, mechanical damping) integrated with controlled actuators to generate the desired dynamics.

By using physical springs in the current invention, ground reaction forces and impulses may not be controlled with the same fidelity as designs utilizing fully active controlled dynamics. Also, once passive dynamic components are physically fabricated (cut in metal), they cannot be changed like a software controller and thus are not as flexible. However, well-considered degree-of-freedom couplings and passive dynamics have the benefits of infinite bandwidth, minimization of internal work loops between actuators, and the potential for dimensional reduction and fewer actuators. In addition, the stability benefits of the spring-mass system are captured, and the self-stable nature of the behavior does not require high fidelity force control. Passive stability may also be influenced by the location of the center of mass relative to the kinematics of the robot or animal. A further advantage of the present invention is that it may include higher efficiency and power generation with smaller actuators, allowing lighter-weight machines for higher performance.

In yet a further aspect of the present invention, control ideas may be implemented in hardware to explicitly stabilize the passive dynamics mechanically. This concept is based on the idea that inherent stability can be improved through embedding certain control principles as mechanical coupling directly in the passive dynamics of the bipedal system. In one exemplary approach, the present invention may provide lateral stability in walking and running in a manner similar to that of a bicycle: primarily planar, with a lean-to-yaw coupling that imparts passive stability for upright balancing.

In a particular exemplary configuration of various aspects of the present invention, a robot for legged locomotion (incorporating passive dynamics) may be provided having a body and a leg having first, second, and third links. The first and second links may be pivotally mounted to one another, and the second and third links may be pivotally mounted to one another; the first link may have opposing first and second ends, with the first end pivotally mounted to the body. A first actuator and a first rotational element each may be mounted at the body; the first actuator and rotational element may be operably connected such that the first actuator is configured to rotate the first rotational element to rotate the first link about its first end. A second actuator and a second rotational element each may be mounted at the first link, and the second actuator and second rotational element may be operably connected such that the second actuator is configured to rotate the second rotational element to rotate the second link relative to the first link. The first and second actuators may be operable to swing the leg and extend/retract the first leg along a leg length direction. In addition, a transmission may be operably connected between the first and second rotational elements, and may be configured to transmit rotational movement of the first rotational element to the second rotational element. A first leg spring may be disposed in series between the first link and the third link, and a second leg spring disposed in series between the second actuator and second link. The leg springs may be configured to store energy therein during a first portion of a stance and configured to recover the stored energy during a second portion of the stance to provide passive dynamics for locomotion.

In addition, one or more gimbal actuators may be operably connected between the first link and the body. In particular, two gimbal actuators may be operably connected between the first link and the body, with the axis of rotation of each gimbal actuator oriented orthogonal to one another, so that one of the gimbal actuators controls yaw (to rotate the foot and steer the robot) and the other gimbal actuator controls adduction/abduction (to effect sideways balancing). Moreover, the axes of the two gimbal actuators each may be disposed orthogonal to an axis of rotation of the first actuator.

BRIEF DESCRIPTION OF THE DRAWINGS

The foregoing summary and the following detailed description of exemplary embodiments of the present invention may be further understood when read in conjunction with the appended drawings, in which.

DETAILED DESCRIPTION OF THE INVENTION

Figure 1:
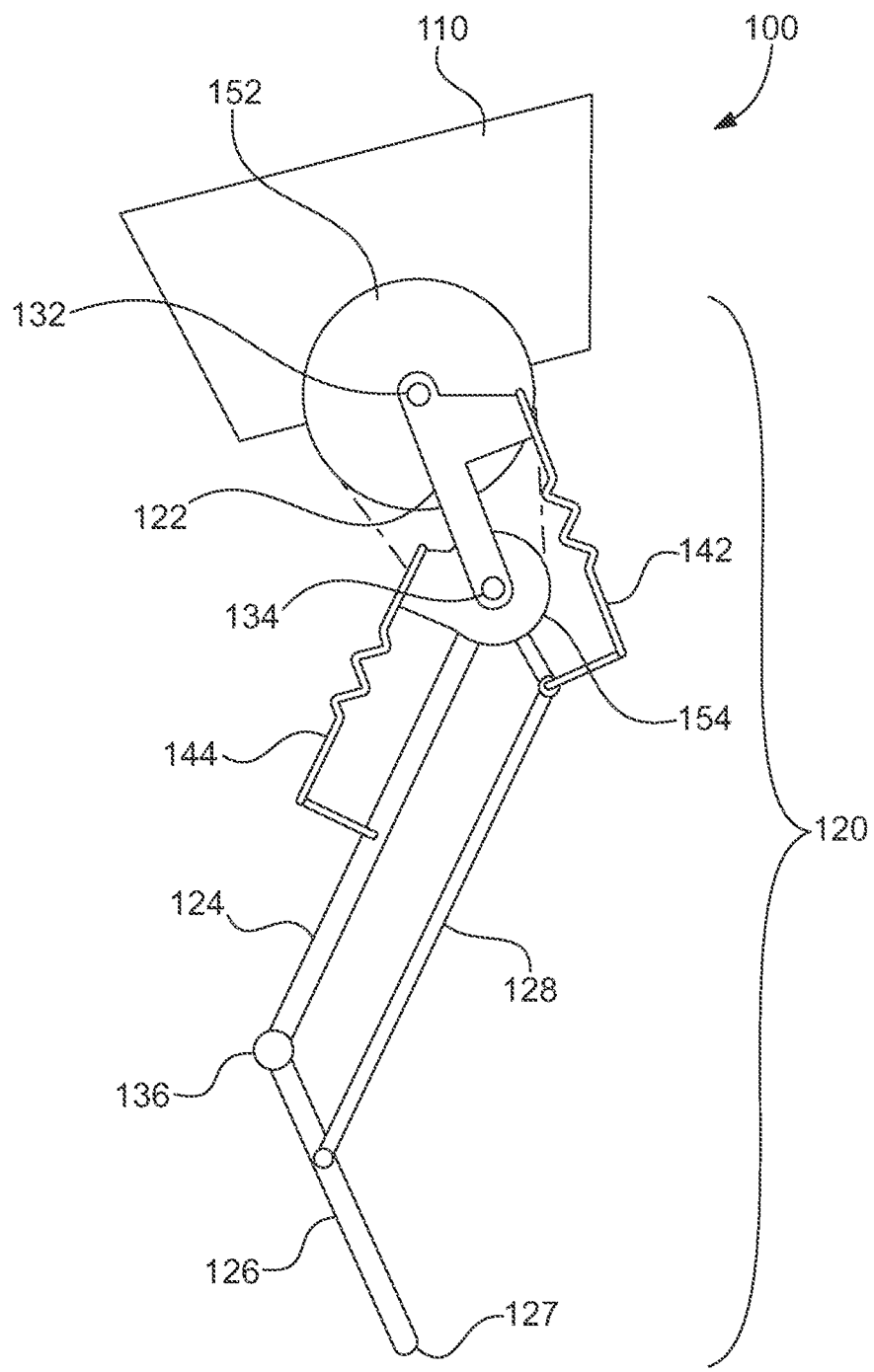
FIG. 1 schematically illustrates an exemplary kinematic model of a 3-link robotic leg of the present invention connected to a robot body.
Figure 2:
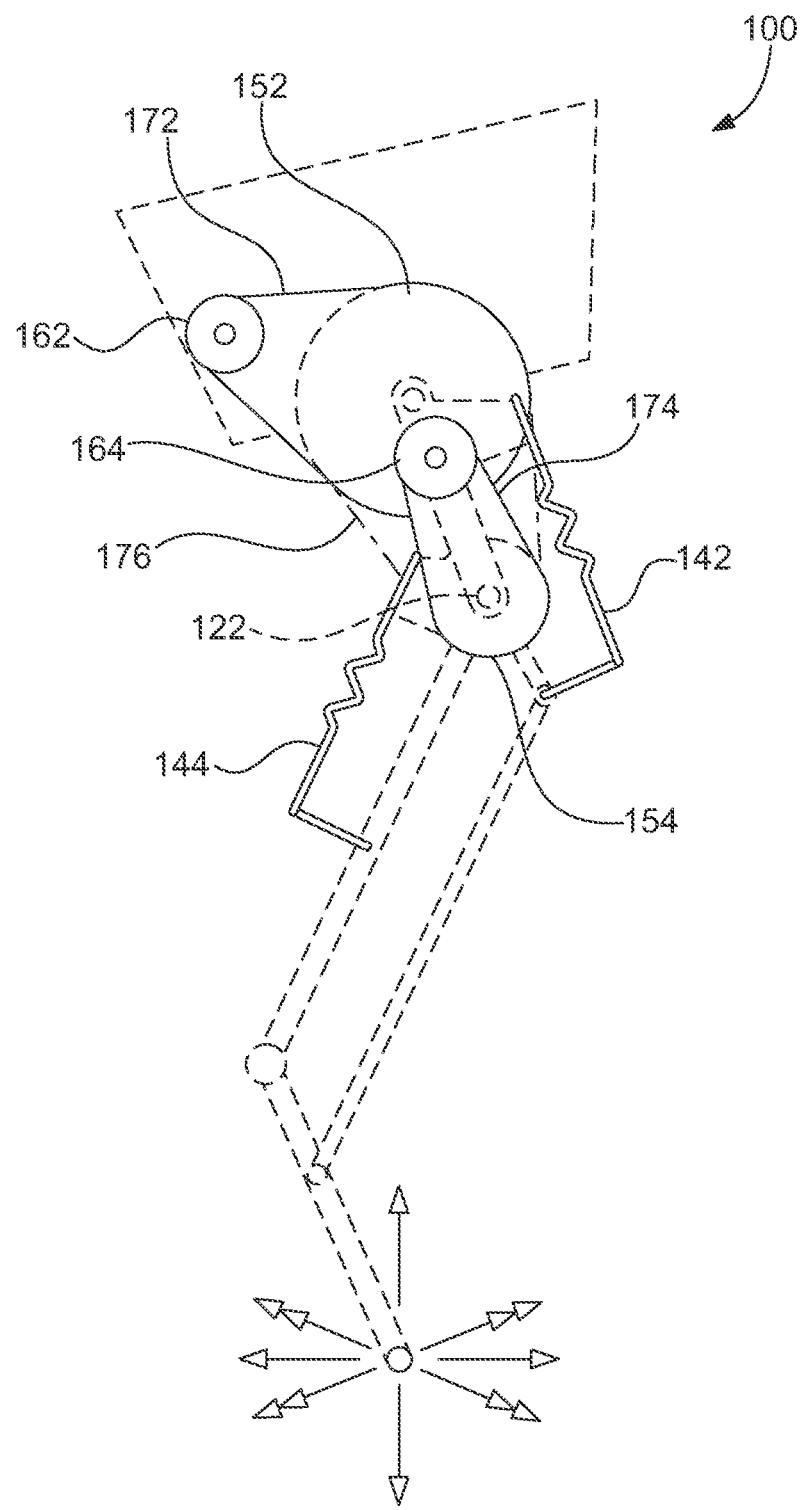
FIG. 2 schematically illustrates the leg of FIG. 1, but with the leg and body shown in phantom to illustrate the configuration of actuators (e.g., motors), pulleys, and springs relative to the body and leg.

Referring now to the figures, wherein like elements are numbered alike throughout, FIGS. 1 and 2 schematically illustrate an exemplary robot 100 having an exemplary leg 120 for legged locomotion. One exemplary configuration of a robot of the present invention may include: a leg 120 comprising at least first, second, and third links 122, 124, 126, connected to each other by joints 134, 136 and to a body 110 by a joint 132; a first actuator 162 mounted on the robot body 110 to primarily control leg angle; a second actuator 164 disposed on the first link 122 used primarily to control leg length; the use of physical springs 142, 144 in the leg 120, in a literal approximation of a spring-mass model to create series elasticity between the distal two links 124, 126 and the actuators 162, 164 and the first link 122 and the second pulley 154; the use of mechanical transmissions 152, 154, such as pulleys, to constrain the motion of the at least three links 122, 124, 126 so they can be controlled by the at least two actuators 162, 164. The springs 142, 144 may be placed so that the lower leg comprising links 124, 126 is compliant in all directions. There is no restriction that any spring 142, 144 acts in the leg length, but the combined effect of the deflection of the springs 142, 144 under load may result in spring-mass behavior. The first actuator 162 may also be rotated off-axis to allow the leg 120 to rotate in the yaw direction to turn the robot 100, or to allow adduction/abduction of the leg 120; but for the purposes of the actuation in the sagittal plane (forward/backward) it may be fixed to the body frame of reference. The actuators 162, 164 and other heavy components may be placed proximate the first link 122 or higher on the leg 120, or mounted on the body 110, above/behind the springs 142, 144 rather than on the second and third links 124, 126. Doing so helps in isolating the inertia of the actuators 162, 164 and other heavy components from ground impact. The distal leg components, e.g., the second and third links 124, 126, together with the mechanical springs 142, 144 may store and release gait energy. The second and third links 124, 126 may be made using high-strength textiles such as Vectran® fiber, carbon fiber composite and bonded machined aluminum components, 3D printed components, and composite structures to create a tough, lightweight 3D linkage (e.g., for pulley and cam shapes) for steering and side-to-side balancing along with the forward/backward motions. The springs 142, 144, may be provided as plate springs made of fiberglass material used in the archery industry, such as plate springs 0.4 inches thick, 4 inches wide, and 18 inches long using GC-67-UB Bar stock (Gordon Composites, Inc., Montrose, Colo.). Thus the actuators 162, 164, springs 142, 144, robot body 110 and other massive parts may be suspended on the springs similarly to an automotive suspension, while the distal components of the leg 120 may be made extremely lightweight to handle repeated ground impacts.

The configuration of the actuators 162, 164 and transmissions 152, 154 may be arranged such that internal work loops are minimized, thus avoiding the scenario where one actuator 162/164 does positive work while the other actuator 164/162 does negative work, to generate a net positive work output for the robot 100. One approach to achieving this goal is to arrange the actuators 162, 164 to actuate leg length and leg angle independently. It is also possible that the actuators 162, 164 could have limited control over some aspect of the movement controlled by the other (e.g., a leg angle actuator, such as actuator 162, could affect leg length, albeit to a lesser degree than the primary leg length actuator 164, and vice versa). Such a configuration can actuators to cooperate in generating work for a task, while minimizing antagonistic work for most tasks. The s springs 142, 144 may be each in series with the two actuators 162, 164, or they may each be each share the loads from the two actuators 162, 164, but sill acting in combination in series with the actuators 162, 164 so the system can produce spring-mass behaviors and implement controllers intended for spring-mass systems.

In one of its aspects, the present invention may be derived from a theoretical analysis to eliminate internal power loops from actuator 162 to actuator 164 in the leg mechanism, engineering expertise to choose appropriate transmissions, and location of the actuators 162, 164 and transmission mass to minimize the impulsive forces during ground contact. As a result, the leg configuration may begin to look like an animal leg in many ways—a thicker and heavier thigh, actuators mounted high on the leg 120 with a compliant link to the lightweight lower leg 124, 126, and three links 122, 124, 126 that are approximately dimensioned like a ground-running bird's leg. While not intended to be bound by any biologic perspective or configuration, we view this as a good sign that we are responding rationally to similar design pressures as the animal.

Referring to FIGS. 1, 2 in more detail, the first link 122 of the leg 120 may be pivotally mounted to the robot body 110 at a proximal end of the first link 122 at a first joint 132. (As used herein the term "proximal" refers to a location closest to the robot body 110, while the term "distal" refers to a location relatively further from the robot body 110.) The distal end of the first link 122 may be pivotally mounted to the proximal end of the second link 124 at a second joint 134, and the distal end of the second link 124 may be pivotally mounted to the proximal end of the third link 126 at a third joint 136. Optionally a transmission, such as a fourth link 128, may be provided between the first link 122 and third link 126 to transmit rotation at the second joint 134 to move the third link 126 about the third joint 136. In addition the first actuator 162, such as a motor having a rotary shaft, may be mounted to the body 110. The first actuator 162 may rotate a first rotational element 152, such as a pulley, through a transmission 172, such as a cable, to effect rotation of the first link 122 about its proximal end at the first joint 132, FIG. 2. The second actuator 164, such as a motor having a rotary shaft, may be mounted on the first link 122 at a location between the proximal and distal ends thereof, FIG. 2. The second actuator 164 may rotate a rotational element 154, such as a pulley, via a second transmission 174, such as a cable, to adjust the leg-length. (As used herein leg length is measured along a virtual line between the proximal end of the first link 122 at joint 132 and a distal end 127 of the third link 126.) In addition, a transmission 176, such as a cable may be mounted between rotational element 152 and rotational element 154 to transmit rotary motion therebetween.

Figure 3A:
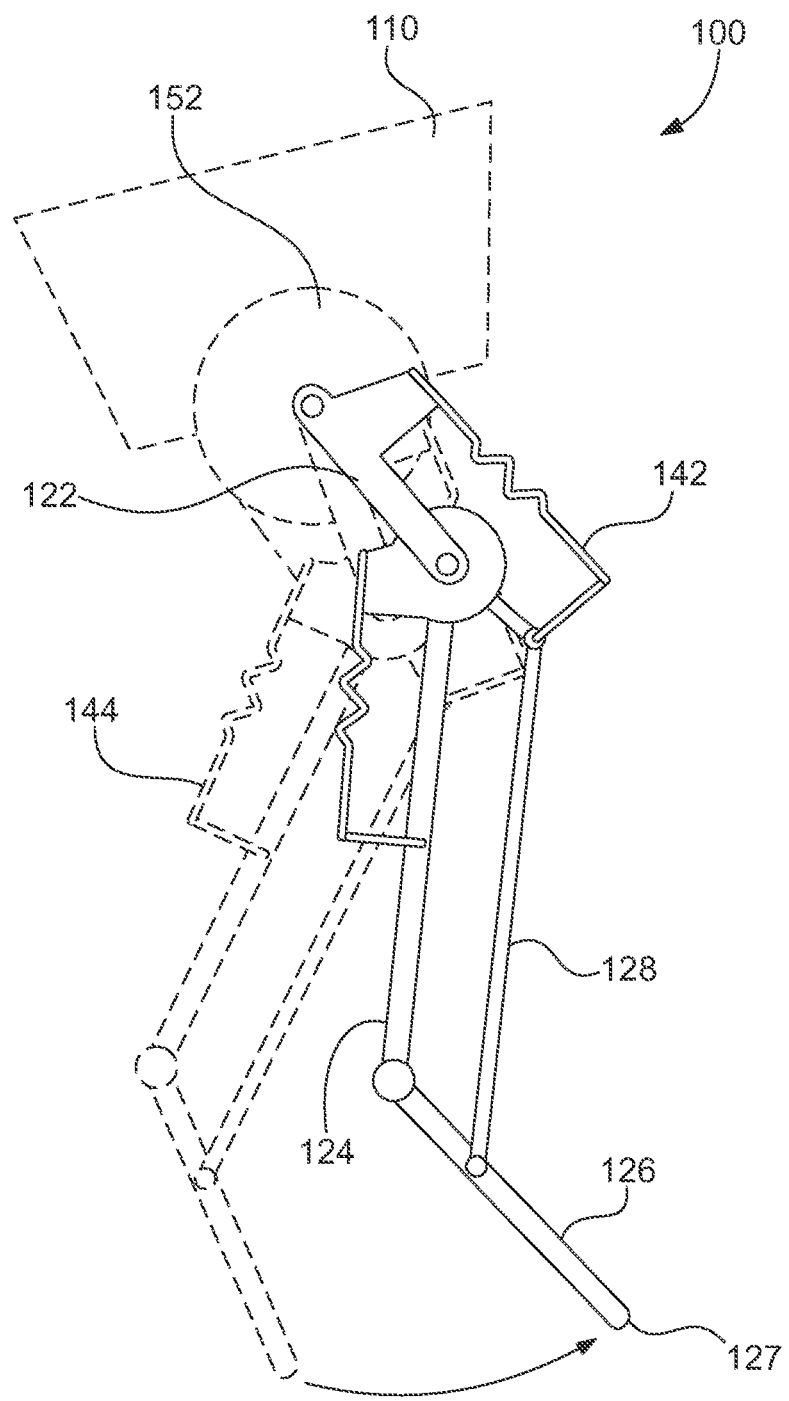
FIGS. 3A-3B schematically illustrate the leg of FIG. 1, with the solid lines showing various locations of the leg after movement of the leg by the actuators.
Figure 3B:
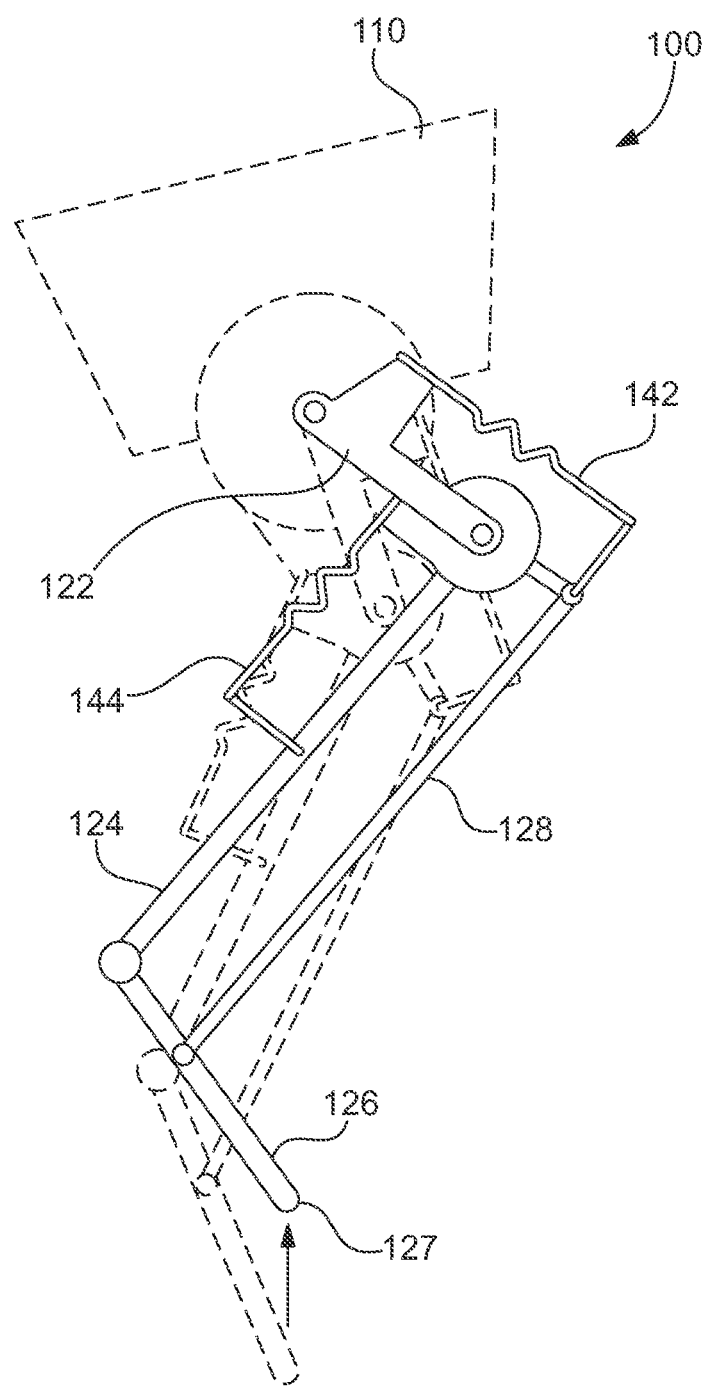

As shown in FIG. 3A, movement of the leg 120 by the first actuator 162 may principally swing the leg 120 from a first position (shown in phantom) to a second position (shown in solid line) sweeping the distal end 127 of the third link 126. In addition, as shown in FIG. 3B, movement of the leg 120 by the second actuator 164 may principally change the leg length while optionally maintaining the distal end 127 along a vertical line, where the leg length is shortened when moving from a first position (shown in phantom) to a second position shown (in solid line close). Optionally the sum of the lengths of the first and third links 122, 126 may be selected to be equal to the length of the second link 124. If the lengths of the first and third links 122, 126 add to be the same length as the length of the second link 124, and if the pulleys 152 and 154 are round, and if pulley 152 has twice the diameter of pulley 154, then rotation of the of the first rotation on 152 (under no load, so as not to deflect the springs 142, 144) will result in direct leg extension and retraction. If the lengths of first and third links 122, 126 do not add up to be the same length as that of the second link 124, cam-shaped pulleys may be utilized to compensate for varying link lengths and may have the same result of first actuator 162 extending and retracting the leg 120. Maintaining the separation of the effects of actuators 162, 164 into leg-length and leg angle movement, respectively, is one method to prevent internal power loops in the robot 100.

Figure 3C:
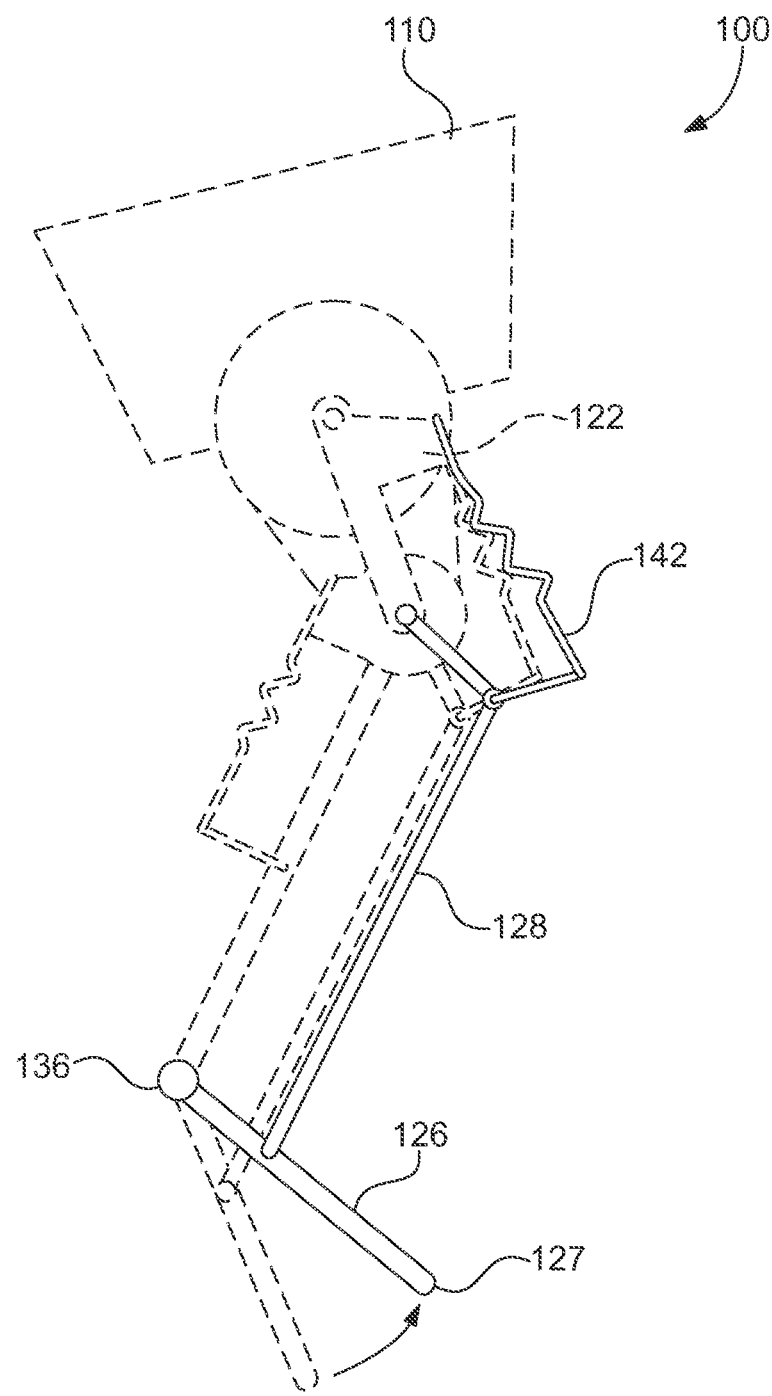
FIGS. 3C-3D schematically illustrate the leg of FIG. 1, with the solid lines showing various locations of the leg after movement of the leg, with spring deflection, caused by a force applied to the distal (ground-contact) end of the leg.
Figure 3D:
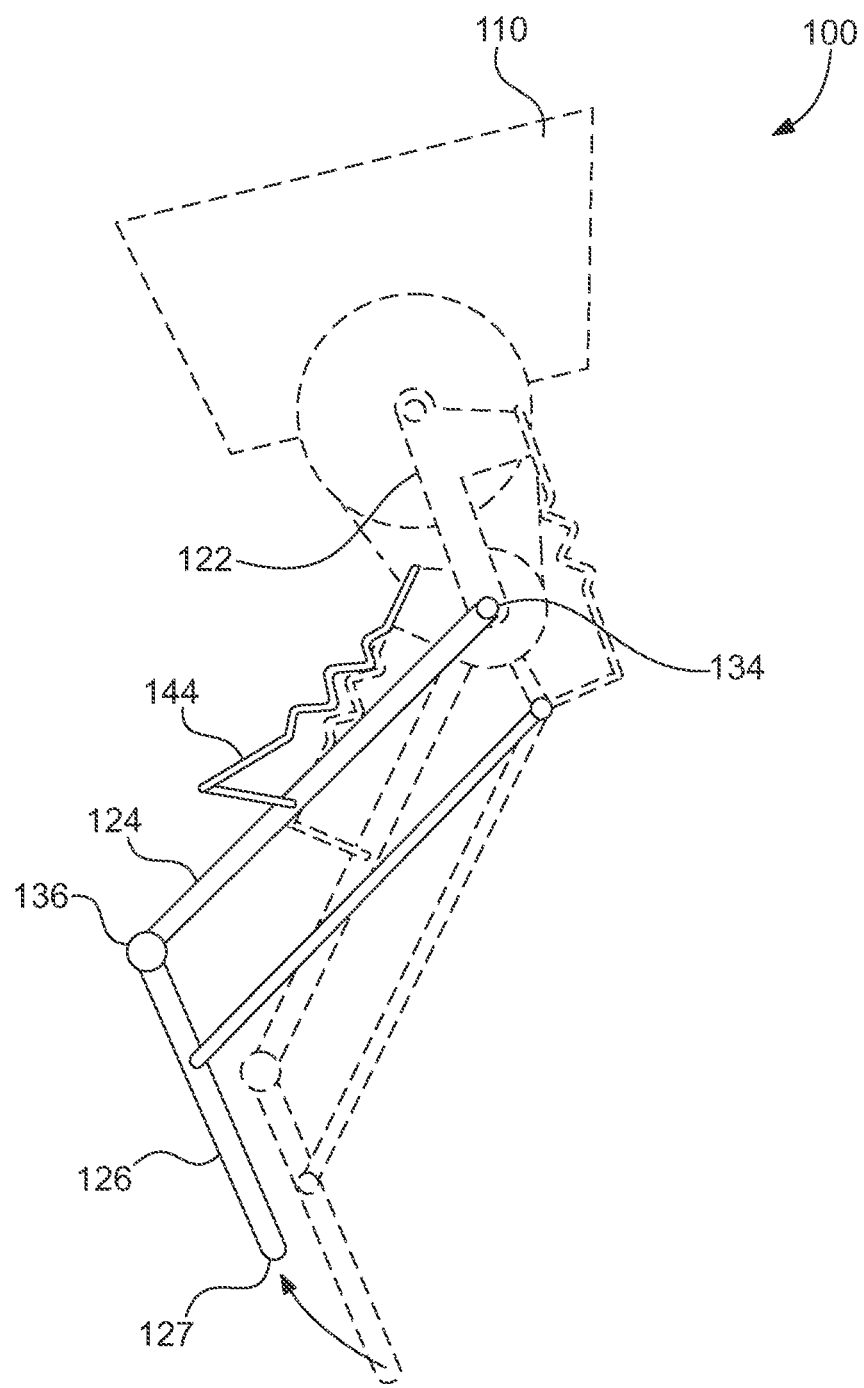

In another of its features, robots 100 and legs 120 of the present invention may be configured to assist in isolating the body 110 and components proximate thereto, such as actuators 162, 164 from impact forces present at the distal end 127 of the leg 120. In particular, if an impact at the distal end 127 of the leg 120 were to cause rotation of the third link 126 about the third joint 136, such rotation may be transmitted to the first leg spring 142 via the fourth link 128 causing the first leg spring 142 to deflect, FIG. 3C. In addition, if an impact at the distal end 127 of the leg 120 were to cause the second link 124 to rotate about the second joint 134, the second leg spring 144 could deflect in response, FIG. 3D. In either the situations depicted in FIGS. 3C and 3D the first link 122 may remain stationary, to assist in providing the isolation. Thus, during walking and running, the leg's impact with the ground may generate impulsive paths of the leg 120, which, in the absence of springs, may lead to large forces of these impacts and may lead to instantaneous motion of heavy components of the robot 100. However the springs 142, 144 may accommodate any motion of the leg 120 during impact, smoothing and lowering peak forces.

Figure 4:
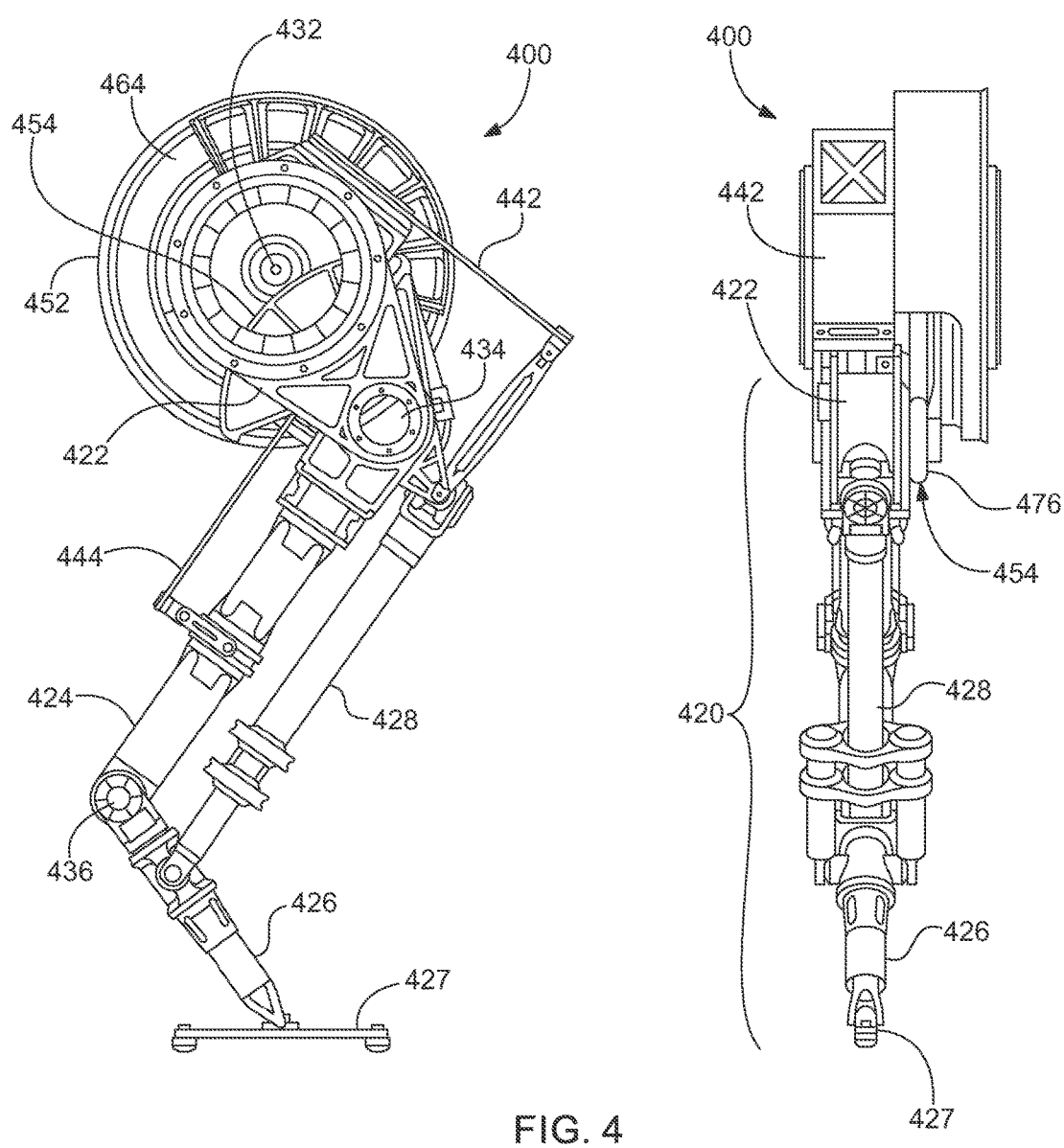
FIG. 4 schematically illustrates side and rear elevational solid model views of a robotic leg that provides an exemplary implementation of the leg of FIGS. 1 and 2.

An exemplary physical realization of a robot 400 in accordance with the present invention incorporating many of the features noted in connection with FIGS. 1-3D is illustrated in FIG. 4. A similar numbering convention is used in FIG. 4 as is used in FIG. 1, where similarly named parts have reference numerals having the same final two digits (e.g., 120 vs. 420). Specifically, the robot 400 includes a leg 420, having first, second, third, and fourth links 422, 424, 426, 428 and a foot 427. First, second, and third joints 132, 134, 136, pulleys 452, 454, a motor 464, and a cable 476 connecting the pulleys 452, 454 are provided at analogous locations to those depicted in the robot 100. The motor 464 may be mounted to the first link 462 and coaxial with the first joint 432.

Figure 5:
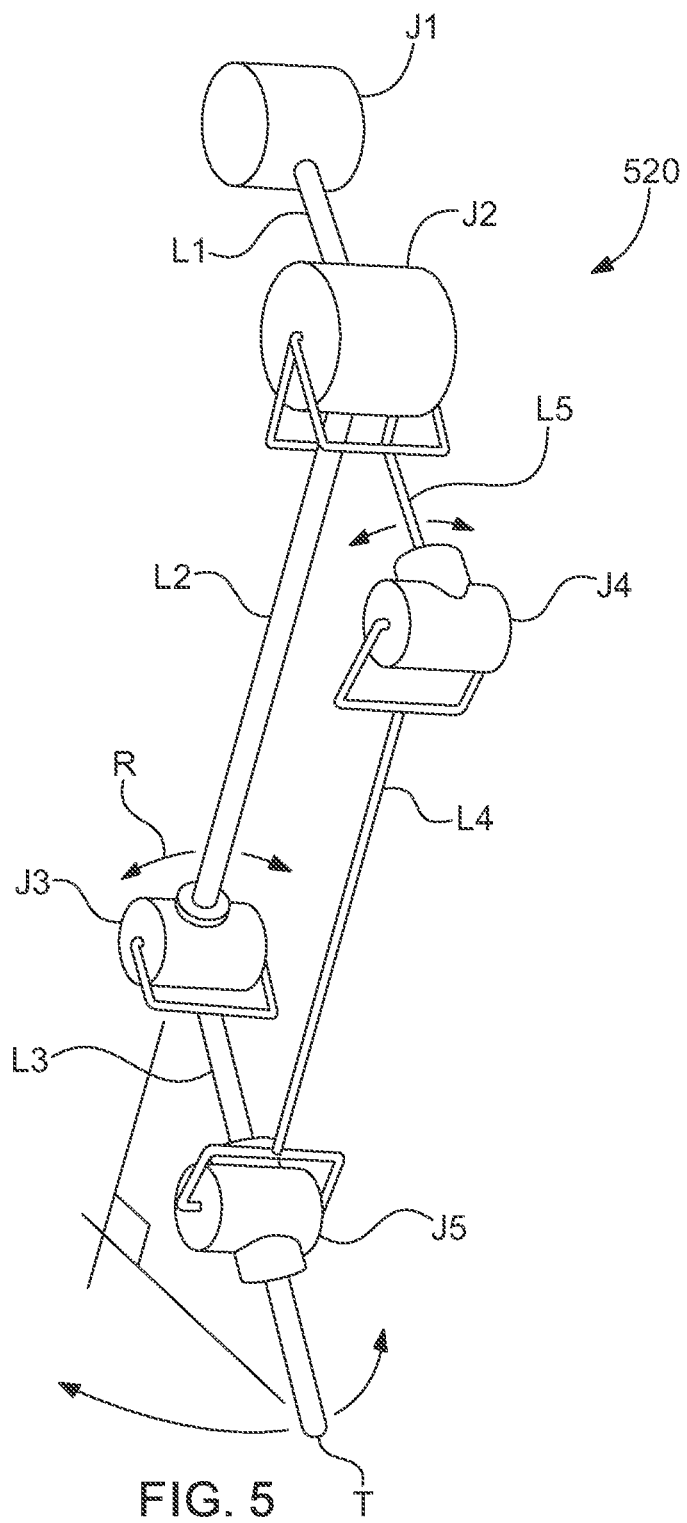
FIG. 5 schematically illustrates adduction/abduction in an exemplary kinematic model of a 3-link robotic leg of the present invention.

In yet another feature of robots of the present invention, adduction/abduction may be provided in the leg 520 as illustrated in the kinematic model of FIG. 5. Specifically the leg 520 can include links L1, L2, L3, L4, joints J1, J2, J3, J4, J5, all of which may be disposed in a like manner as similarly named parts as shown in the robot 100 of FIG. 1. However, link L2 may be configured to rotate in a direction R about its axis. This causes the third link L3 to swing about the axis of the second link L2, and also causes swing and rotation of the fourth and fifth links L4, L5 as well as joints J4, J5. A purpose of this actuated degree of freedom is to allow both or either yaw motion to the robot (steering) and/or adduction/abduction (side-to-side balancing) to the robot. It should be noted that this is a schematic drawing, and as such, links L4, L5 and joints J4, J5 may be implemented using belts, cables, or other linkages, for example.

Figure 6:
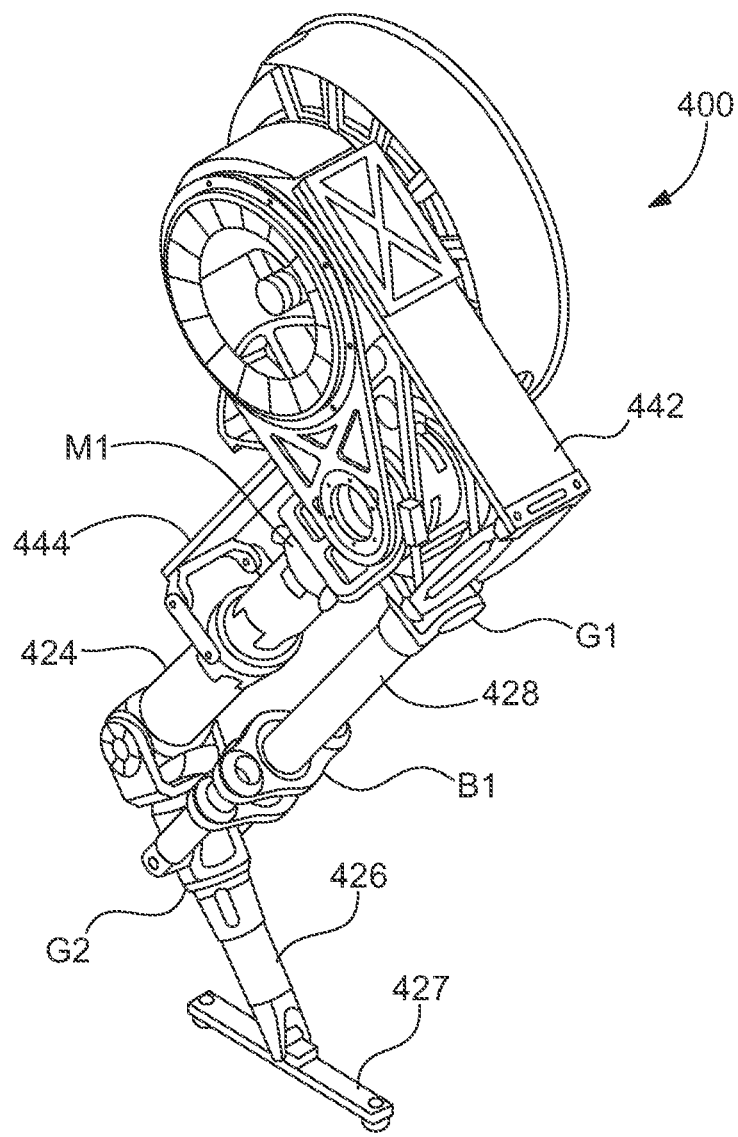
FIG. 6 schematically illustrates an isometric view of the model of FIG. 4.

An exemplary physical realization of these features is represented in the robot 400 of FIG. 4, also shown an isometric view in FIG. 6. In particular, with reference to FIG. 6, the leg 420 may include a first 2-axis gimbal G1 to allow twist, and a bearing B1 may be provided at the fourth link 428 to allow the fourth link 428 to twist. A motor M1 (or actuator) may be provided at the second link 424 to rotate the second link 424 about its axis. The motor M1 need not be fast or powerful, but high torque is desired, so a small, highly-geared motor would suffice. Shock tolerance in the form of series elasticity will protect the motor M1 from the regular ground impacts, while allowing position control under no-load swing-phase conditions, and force control during the stance phases to apply torques to balance the body roll when the foot 427 is planted on the ground. A second 2-axis gimbal G2 disposed at the third link 426 may be provided to allow adduction/abduction, as well as normal operation in the sagittal plane (swinging forward and backward). Thus, the lower leg, comprising the second and third links 424, 426, may be a 3D linkage, able to twist as well as move in the sagittal plane, to enable frontal plane balance as well as yaw control. These distal leg components (second and third links 424, 426) may have no actuators, minimal sensors, and very low mass.

Such features are particularly desirable for a legged robot to operate without support, so that the robot may balance side-to-side (in the frontal plane) as well as forward-backward (in the sagittal plane). However, most of the strength and power in walking or running is associated with the sagittal plane motion. As a result, a leg configuration of the present invention may require large motors associated with the sagittal direction. One approach for implementing adduction-abduction, as noted above, is to rotate the second link 424 about its axis. This axis changes depending on leg angle and leg length, but some component of the motion of the second link 424 may be in the frontal plane, effecting an adduction-abduction of the foot 427. The remaining component of the motion of the second link 424 may be in the yaw direction or the top plane, effecting a rotation of the foot 427 relative to the body 410. This coupling between roll and yaw, or lean-to-steer, is potentially useful for high-speed locomotion.

Additionally, a steering actuator could be mounted at the second joint 434, which moves with the first link 422; as such, the steering actuator (along with first link 422) does not change speed instantaneously during ground impact, and would not add significantly to the effective mass of the lower leg components (second and third links 424, 426) that may be regularly jolted by ground impacts. The actuator may be mounted to the second link 424, and as such, may rotate at the second joint 434 with the second link 424; this relatively small additional inertia would add to the effective mass of the lower leg components, but by a very small amount.

Another approach for implementing adduction-abduction to balance in the frontal plane in accordance with the present invention is to mount the leg structure components associated with sagittal plane motion on the first joint 432. The first joint 432 should be very sturdy, to handle the mass of the leg 420, and rather large to hold the sizable upper leg link, e.g., first link 422. When placing the foot location to balance the robot 400, the massive leg 420 and large motors 462, 464 are moved around, which can significantly affect the roll of the body 410 and the overall balance of the robot 400.

Thus far, the implementation has described adduction/abduction, affecting leg motions in the frontal plane as well as body roll. However, actuation in the yaw direction, to effect steering of the robot, is also an important addition. By actuating the rotational axis of the second link 124, adduction/abduction does occur, but it is also coupled to yaw motion, enabling steering. However, but the motion has only a single DOF, so for a particular size of side step, there will be a resulting yaw rotation of a particular size. The adduction/abduction and yaw rotation cannot be independently controlled. To add an additional degree of freedom, to allow for both steering and side-to-side balancing, a 1-DOF pivot can be added at the hip, or add another DOF added at the second joint 134 to create a 2-DOF actuated gimbal joint. Further, a 2-axis gimbal at the first joint 132, where the leg connects to the body, could implement both adduction/abduction and yaw without the need for an actuator at second joint 134 to rotate the second link 124.

Figure 8:
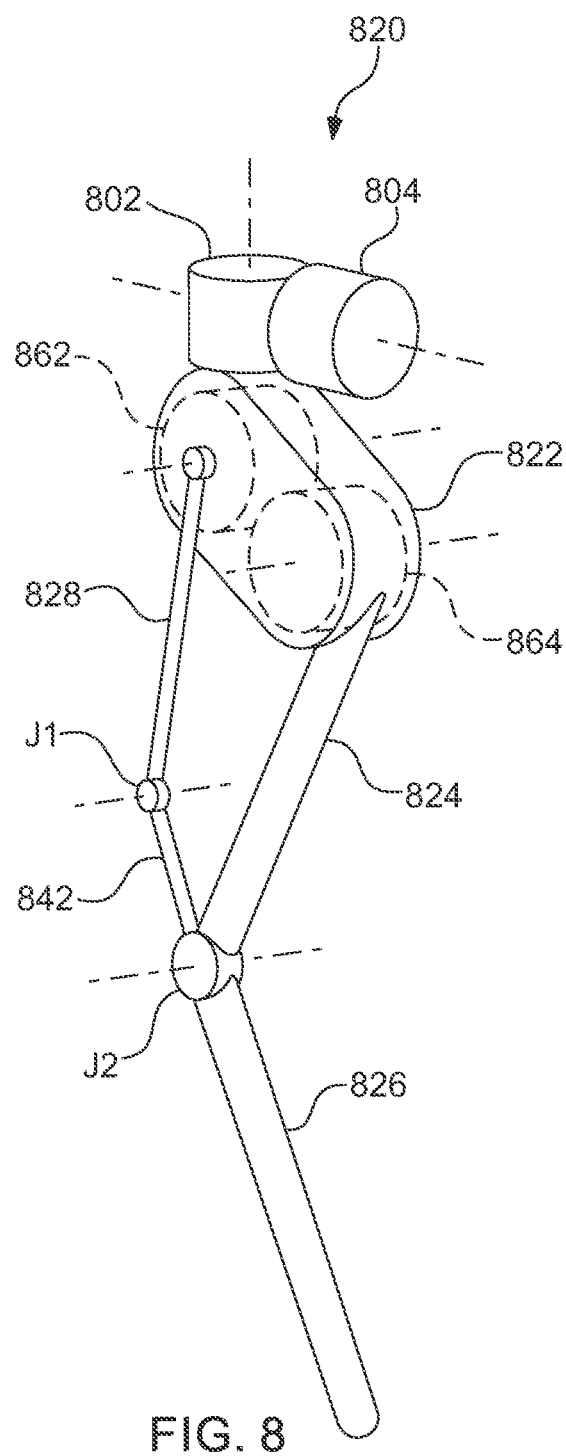
FIG. 8 schematically illustrates adduction/abduction in a further exemplary kinematic model of a 3-link robotic leg of the present invention.

Another approach for implementing adduction/abduction (to balance in the frontal plane) and yaw (to effect steering) may be provided in accordance with the present invention. In particular, rather than provide gimbals G1, G2 on the leg links as per the leg 400 of FIG. 6, the entire leg 820 as a unit may be moved relative to the body to effect yaw and abduction/abduction by providing first and second gimbal actuators 802, 804 at the proximal end of the leg 820, as illustrated in FIG. 8. In this configuration, the first gimbal actuator 802 may have its axis oriented to control yaw and the second gimbal actuator 804 have its axis oriented to control adduction/abduction. The rotational axes of each of the first and second gimbal actuators 802, 804 may also be orthogonal to the rotational axis of a first actuator 862. As to the remaining structure of the leg 820, a similar numbering convention to that of FIG. 1 is used, where similarly named parts have reference numerals having the same final two digits (e.g., 120 vs. 820). Specifically, the leg 820, may include first, second, third, and fourth links 822, 824, 826, 828. A first joint J1 may be pivotally mounted between the fourth link 828 and a spring 842, with the flexible plate spring 842 connected rigidly to the third link 826. The second link 824 may be pivotally mounted to the third link 826 via the joint J2. The first actuator 862 may be mounted to the output of gimbal actuator 802, and may be pivotally mounted to a proximal end of the first link 822, and a second actuator 864 may be mounted to the distal end of link 822 and pivotally mounted to the proximal end of the second link 824. The fourth link 828 may be pivotally connected to the first link 822, and pivotally connected at joint J1 to the third link 826 through the spring 842. The spring 842 and the third link 826 may be connected rigidly, such that they act as a single link, and are connected to the second link 824 through joint J2. The first and second actuators 862, 864 may cooperate to swing the leg 820 and/or extend/retract the leg 820 in the sagittal plane. The spring 842 may be comprised of a flexible material, such that it will flex and impart a spring function between the third and fourth links 826, 828. Alternatively, the spring 842 may be a rigid link, connected through a rotational spring at joint J2 to the third link 826. Alternatively, the first and third links 822, 826 may be connected with an alternative transmission and elastic element, such as a pulley and flexible tendon, to generate a functional relationship between the orientation of the two links. The second actuator 864 may comprise a motor and transmission, such as a cycloid transmission, and a spring operably acting in series between the motor/transmission and the second link 824.

More specifically, movement of such a leg in the sagittal plane, along with spring deflection, is further illustrated in FIGS. 9A-9D for the robot 900. The robot 900 includes a leg 920 having a first link 922 pivotally mounted to a robot body 910 at a proximal end of the first link 922 at a first joint 932. The distal end of the first link 922 may be pivotally mounted to the proximal end of a second link 924 at a second joint 934, and the distal end of the second link 924 may be pivotally mounted to the proximal end of the third link 926 at a third joint 936. A foot 927 may be provided on the distal end of the third link 926. A transmission, such as a fourth link 928, may be provided between the first link 922 and the third link 926. A first spring 942 may have its proximal end pivotally mounted to the distal end of the fourth link 928, and may have a distal end mounted to the proximal end of the third link 926. In addition, a second spring 944 may have its proximal end mounted to the output of actuator 964 and its distal end pivotally mounted to the second link 924. A first actuator 962 may be mounted so that its rotational axis coincides with the rotational axis of the first joint 932, and a second actuator 964 may be mounted so that its rotational axis coincides with the rotational axis of the second joint 934.

Figure 9A:
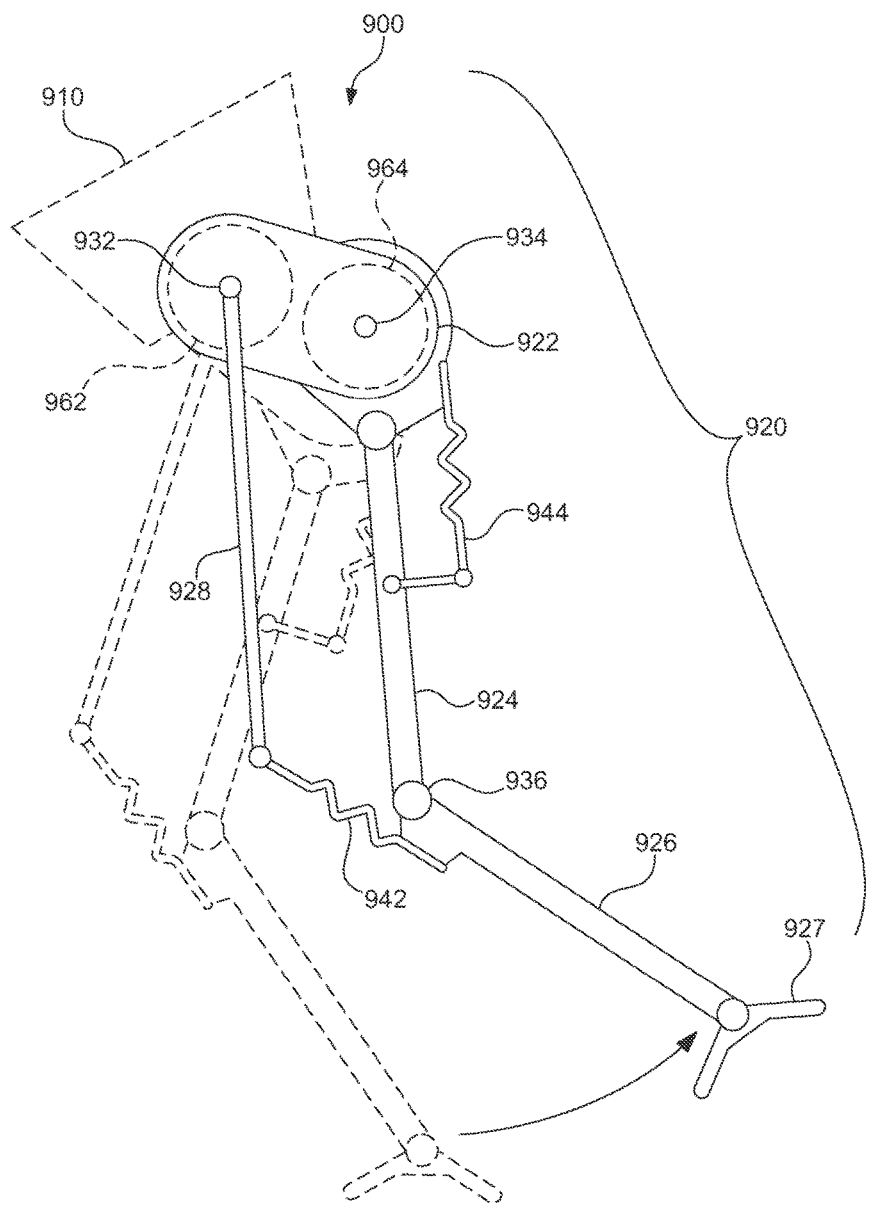
FIGS. 9A-9B schematically illustrate models of the leg of FIG. 8, with the solid lines showing various locations of the leg after movement of the leg by the actuators.
Figure 9B:
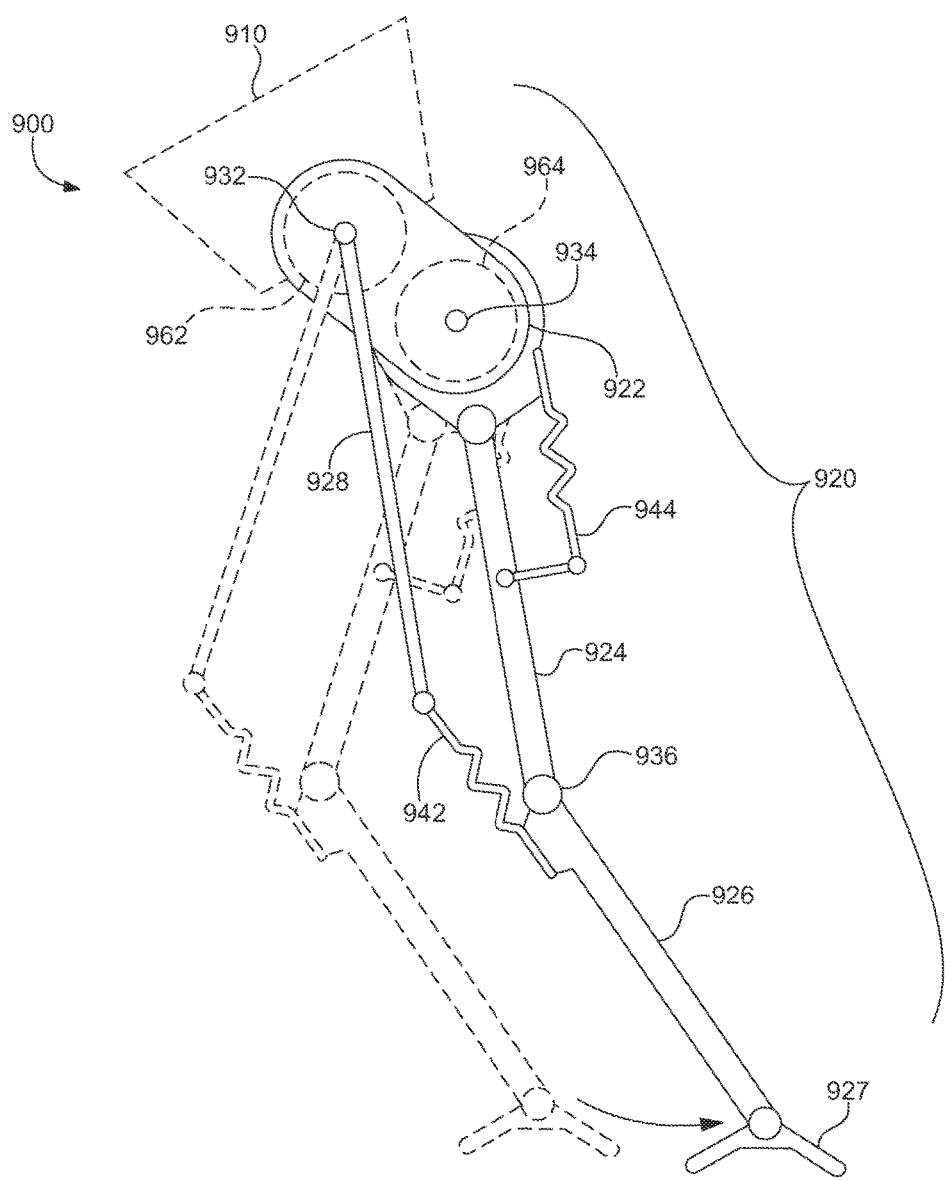
Figure 9C:
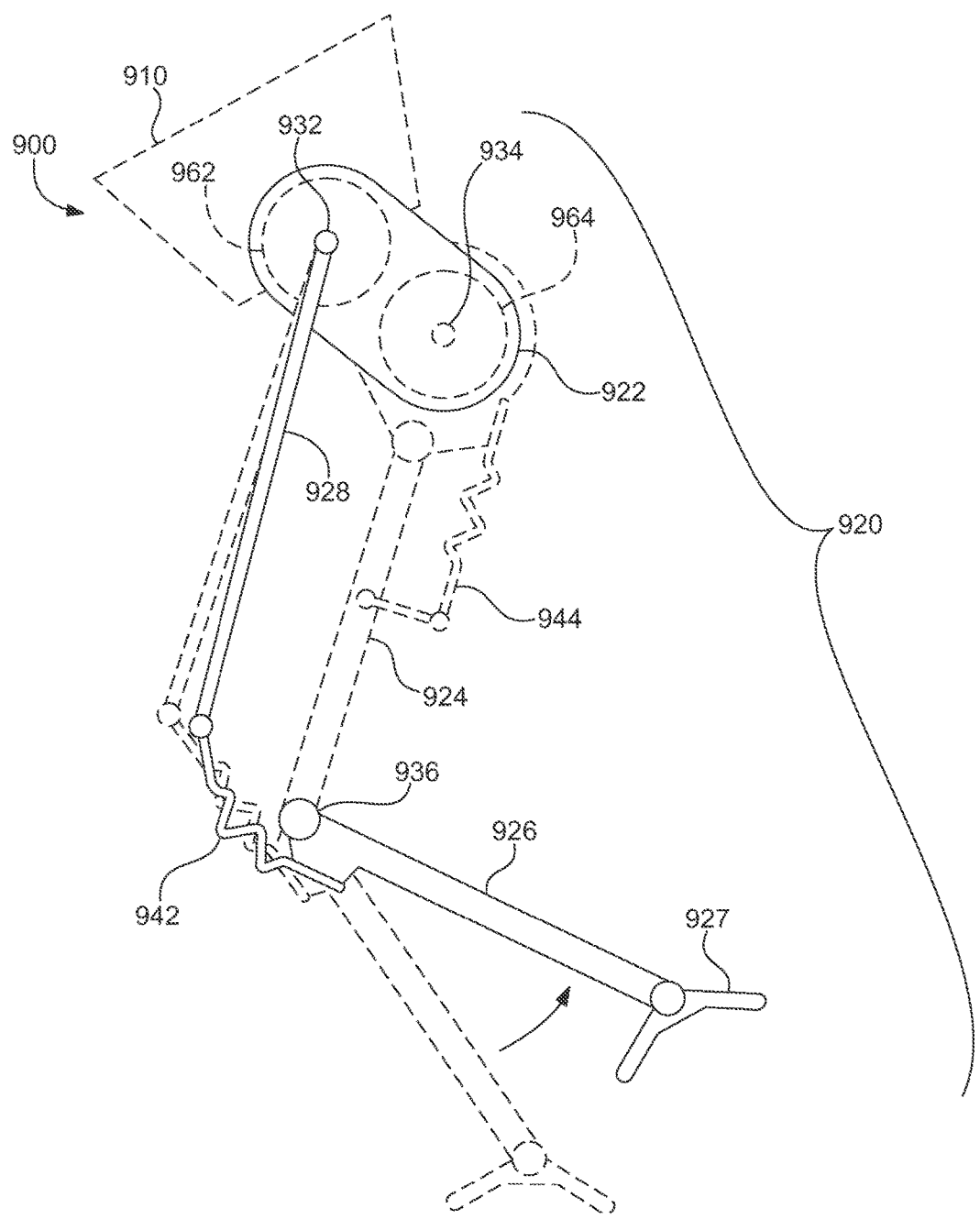
FIGS. 9C-9D schematically illustrate the leg of FIG. 8, with the solid lines showing various locations of the leg after movement of the leg by deflection of at least one of the springs, caused by a force applied to the distal (ground-contact) end of the leg.

As shown in FIG. 9A, movement of the leg 920 by the first actuator 962 may principally swing the leg 920 from a first position (shown in phantom) to a second position (shown in solid line) sweeping the distal end of the third link 926. In addition, as shown in FIG. 9B, movement of the leg 920 by the second actuator 964 may principally change the leg length, where the leg length is increased when moving from a first position (shown in phantom) to a second position shown (in solid line close). If an impact at the distal end of the leg 920 were to cause rotation of the third link 926 about the third joint 936, such rotation may be transmitted to the first leg spring 942 causing the first leg spring 942 to deflect, FIG. 9C. In addition, if an impact at the distal end of the leg 920 were to cause the second link 924 to rotate about the second joint 934, the second leg spring 944 could deflect in response, FIG. 9D. In either situation depicted in FIGS. 9C and 9D the first link 922 may remain stationary to assist in providing isolation. Thus, during walking and running, the leg's impact with the ground may generate impulsive paths of the leg 920, which, in the absence of springs, may lead to large forces of these impacts and may lead to instantaneous motion of heavy components of the robot 900. However, the springs 942, 944 may accommodate any motion of the leg 920 during impact, smoothing and lowering peak forces.

Figure 9D:
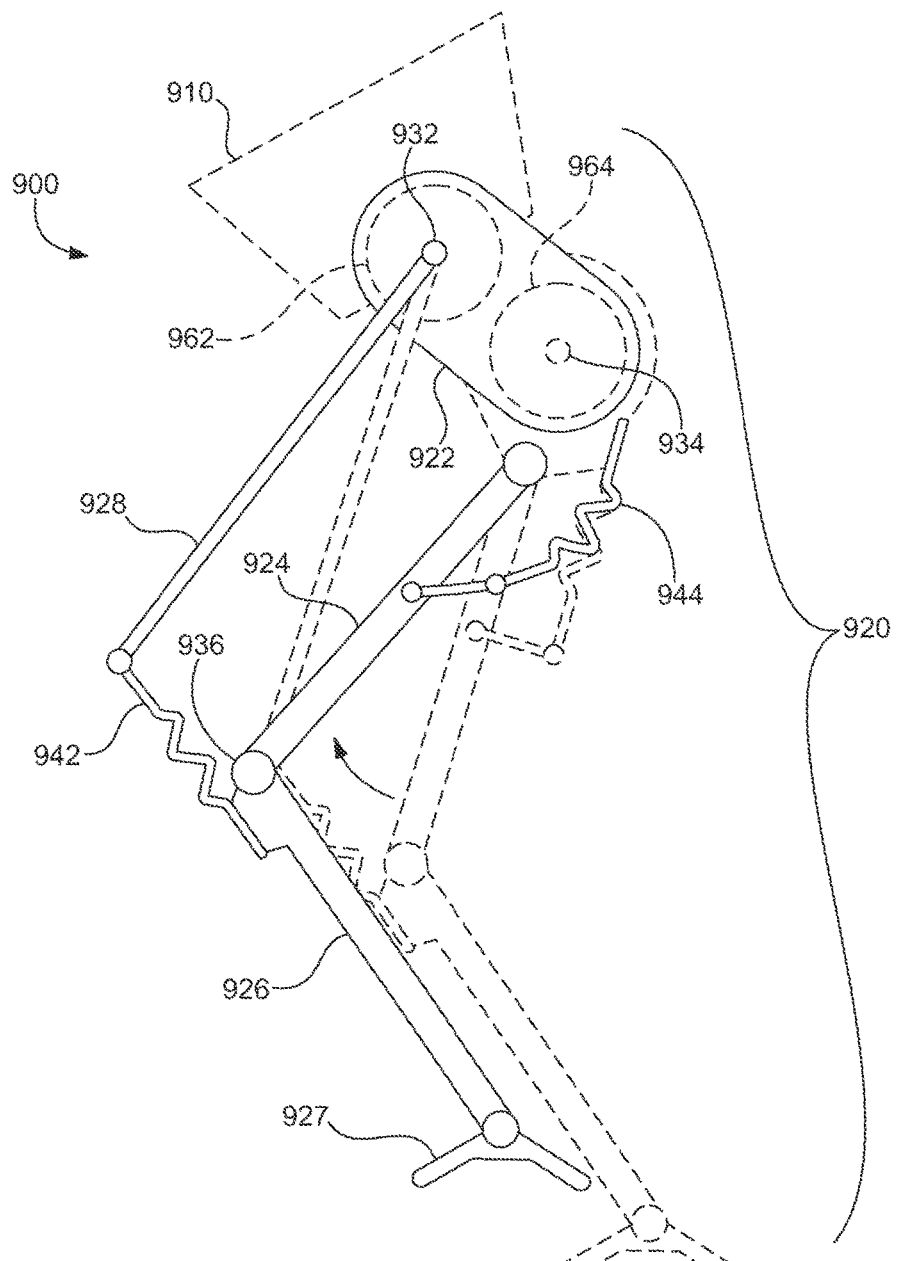
Figure 10A:
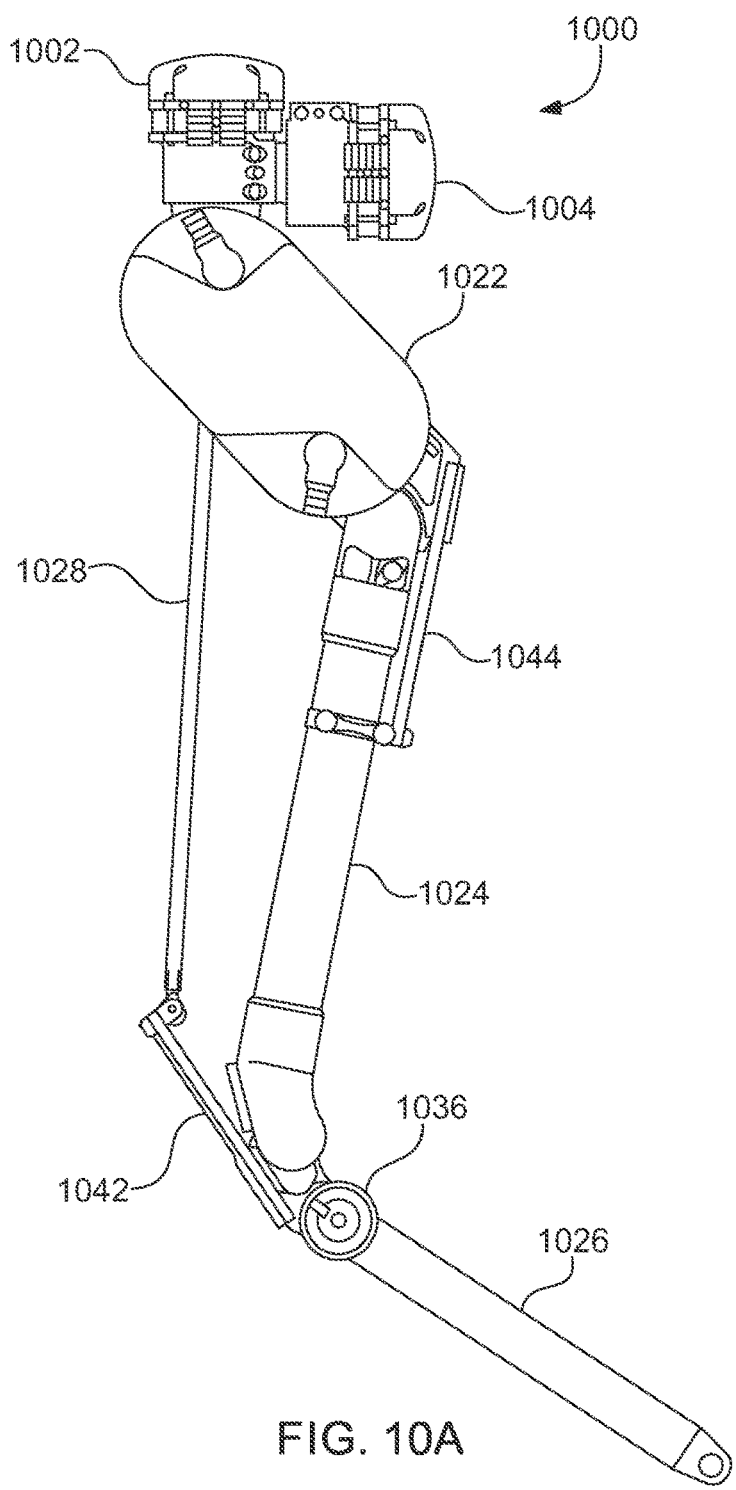
FIGS. 10A-10B schematically illustrate side and rear elevational solid model views of a robotic leg that provides an exemplary implementation of the leg of FIGS. 8 and 9A-9D.
Figure 10B:
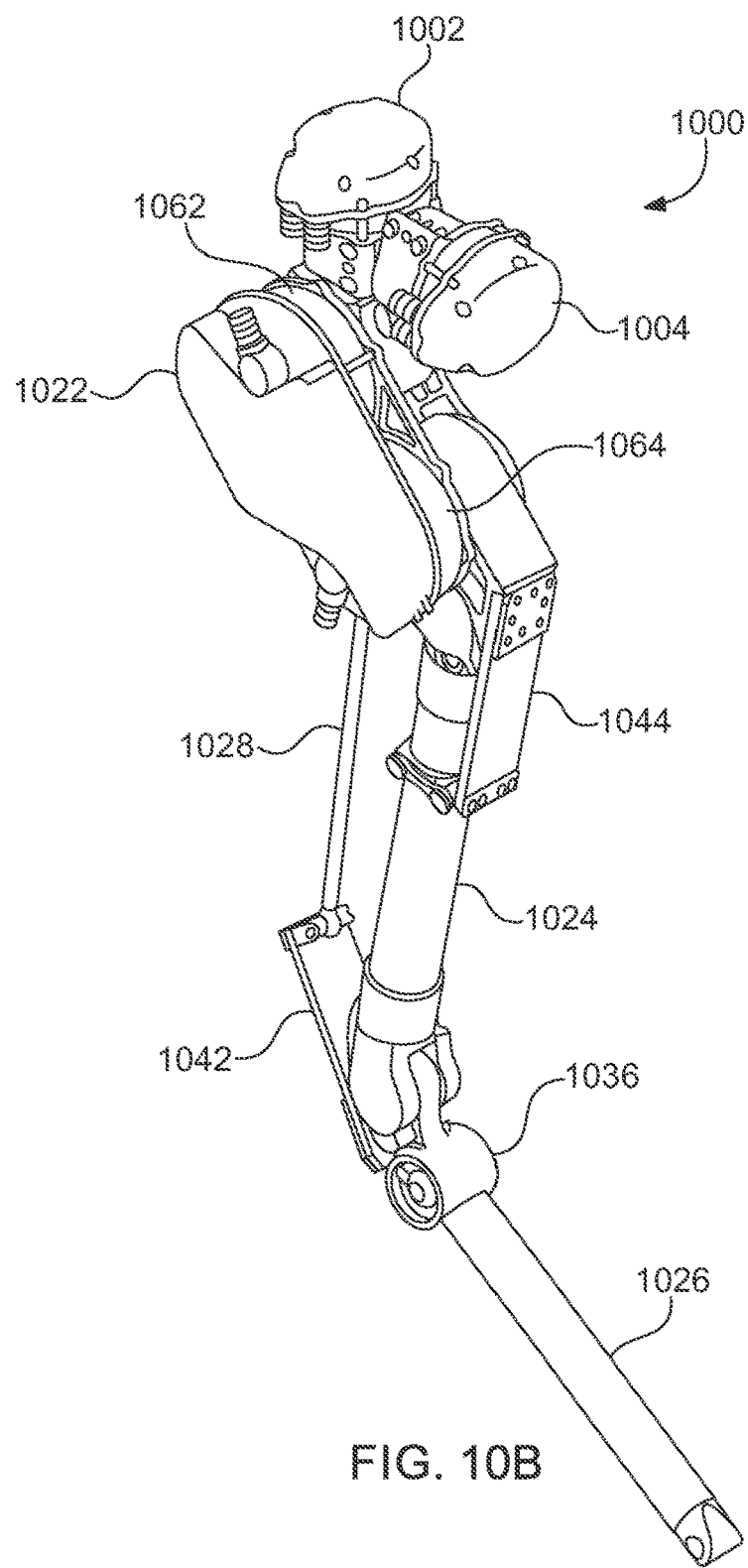

An exemplary physical realization of a leg 1000 in accordance with the present invention incorporating many of the features noted in connection with FIGS. 8-9D is illustrated in FIGS. 10A, 10B. A similar numbering convention is used in FIGS. 10A, 10B as is used in FIGS. 8-9D, where similarly named parts have reference numerals having the same final two digits (e.g., 820 vs. 1020). Specifically, the leg 1000 includes first, second, third, and fourth links 1022, 1024, 1026, 1028 and joint 1036 (joints analogous to joints 932, 934 are present but hidden from view), first and second gimbal actuators 1002, 1004, and springs 1042, 1044 are provided at analogous locations to those depicted in the legs 820, 920.

Figure 7:
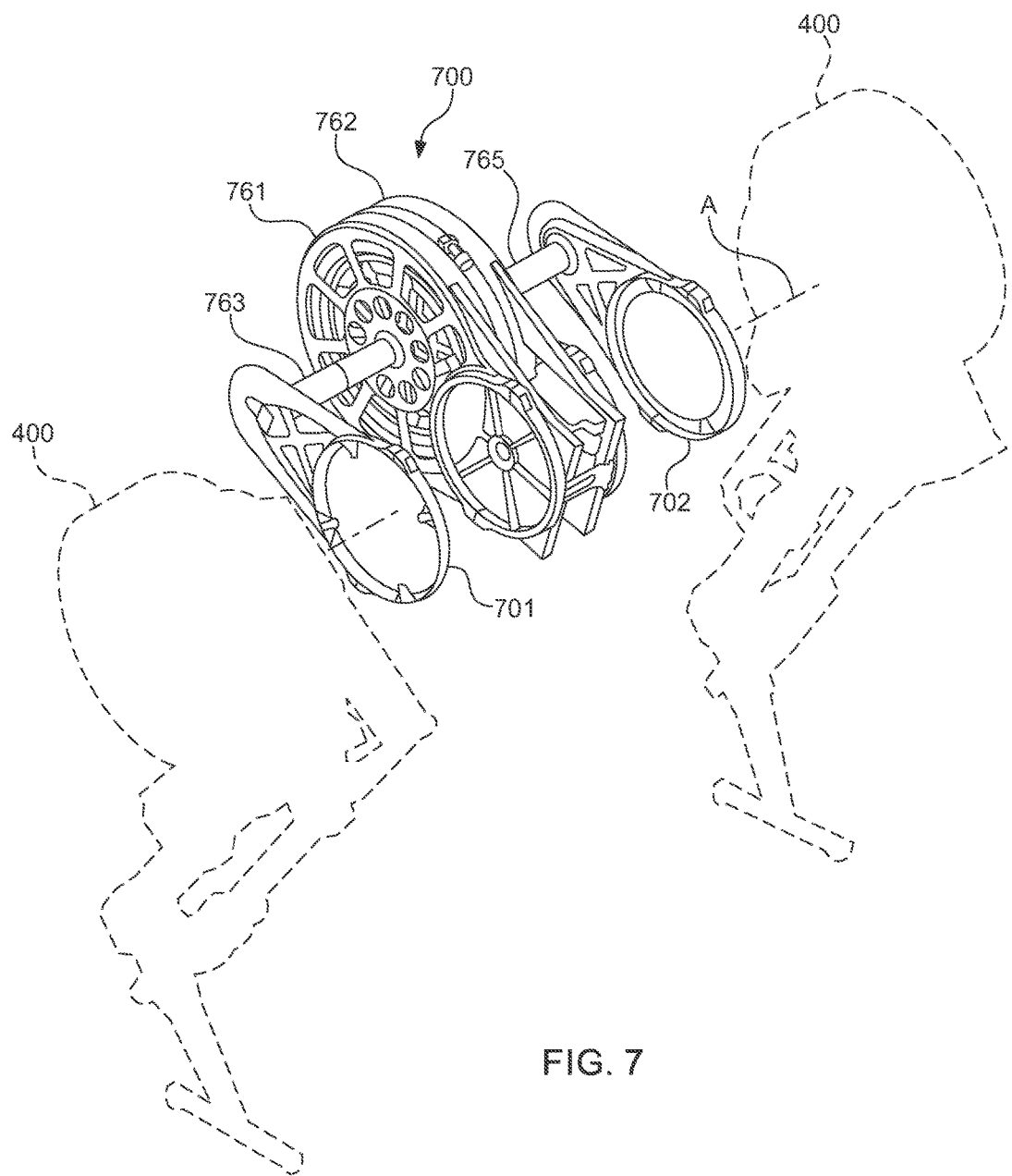
FIG. 7 schematically illustrates an exemplary motor assembly in accordance with the present invention for use with two legs of FIG. 6 (shown in phantom) to provide a bipedal robot.
Figure 11A:
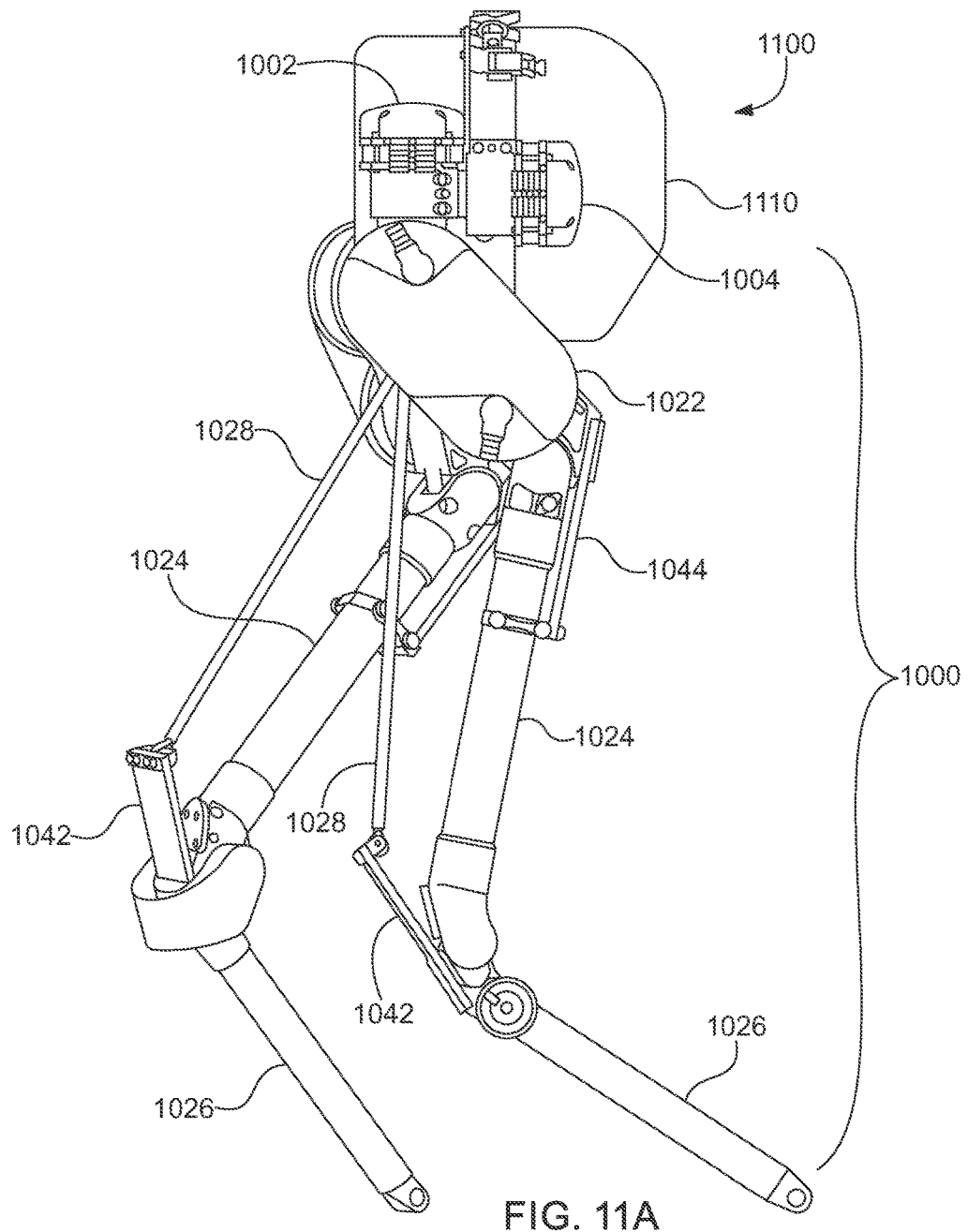
FIGS. 11A-11B schematically illustrate an exemplary motor assembly in accordance with the present invention for use with two legs of FIGS. 10A-10B to provide a bipedal robot.
Figure 11B:
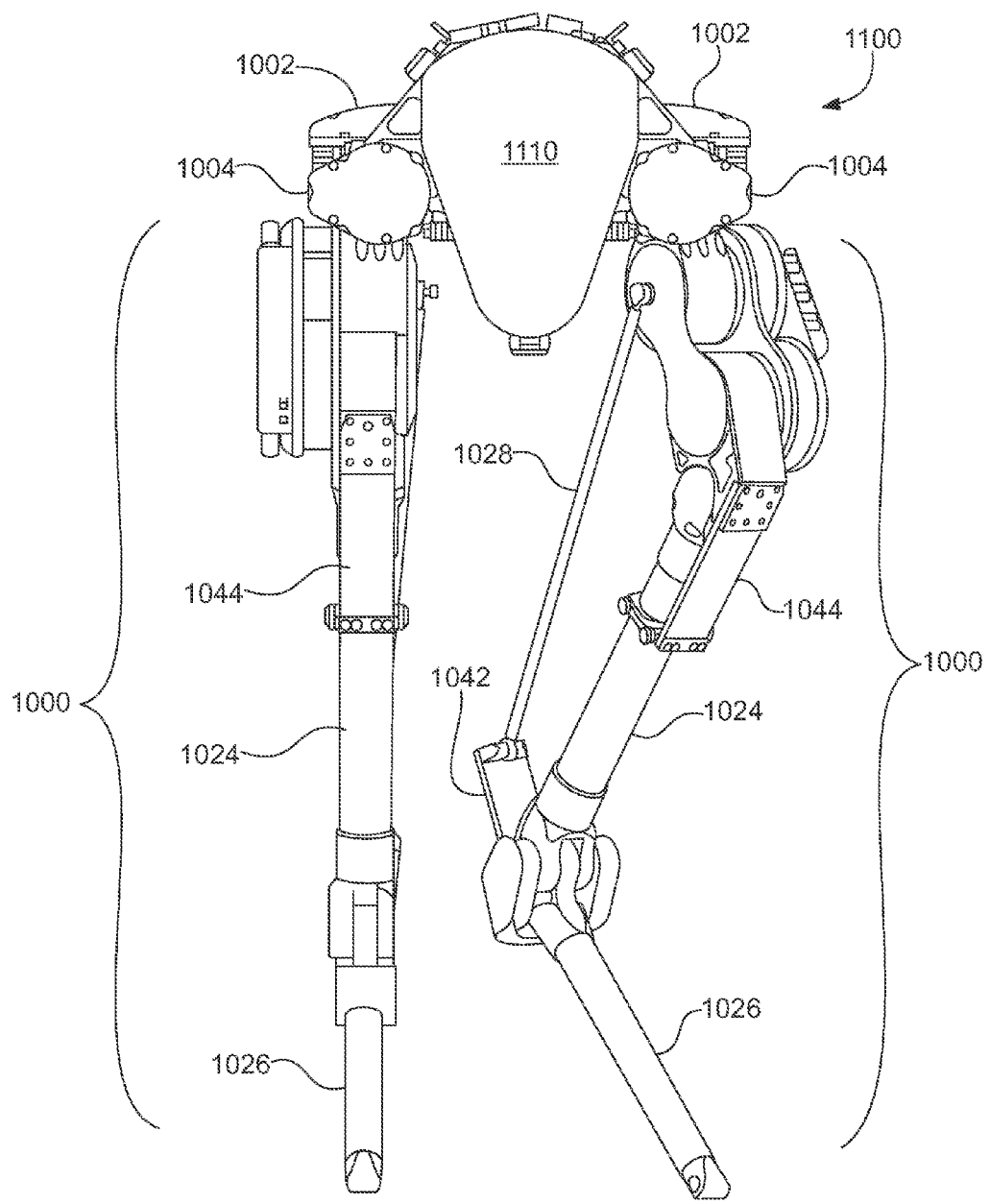

Still further, the present invention may also provide bipedal robots 700, 1100, which in one exemplary configuration utilizes two of the robotic legs 400, 920, such as illustrated in FIGS. 7, 11A, 11B. For a first example, to operably connect the two robotic legs 400, a motor assembly 700 may be provided, which includes first and second motors 761, 762 each having a respective shaft 763, 765, FIG. 7. The assembly 700 may include mounting bearings 701, 702 for each of the robotic legs 400 which may be mounted to the assembly 700 such that the axis of the motor 464 is disposed along axis "A". For a second example, two robotic legs 1000 may be mounted to a body 1110 via gimbal actuators 1002, 1004, in which the first gimbal actuators 1002 may have its axis oriented to control yaw of each leg 1000 and the second gimbal actuators 1004 have its axis oriented to control adduction/abduction of each leg 1000 FIGS. 11A, 11B.

These and other advantages of the present invention may be apparent to those skilled in the art from the foregoing specification. Accordingly, it may be recognized by those skilled in the art that changes or modifications may be made to the above-described embodiments without departing from the broad inventive concepts of the invention. For example, in the drawings, actuators are illustrated as electric motors with a rotational shaft; specifically, a brushless linear DC motor. This is one exemplary implementation, but other methods are also appropriate. For example, motor 162 actuates pulley 152 relative to the body 110, and motor 164 actuates pulley 154 relative to the first link 122. Without significantly changing the drawings, different types of motors could be used—brush motors, brushless motors, stepper motors, frameless motors, axial flux motors, and so on. Any motor suitable technology may be used, but a goal is to minimize rotor inertia and motor mass while maximizing torque and power output.

Likewise, the transmission linking motors 162, 164 to rotating elements 152, 154 are depicted in FIGS. 1-3 as a single cables 172, 174; however, in practice a speed-reducing transmission exists for most types of motor. In FIG. 4, the example transmissions are high-speed cable drives, having two pulleys, one much larger than the other, and two high-tension stranded cables of stainless steel, tungsten, Vectran, or similar. The cables 172, 174 are terminated on each pulley 152, 154; power transmission does not rely on frictional contact with the pulleys 152, 154. Such transmissions are extremely efficient; cable drives have zero backlash; even small effects like minor motor cogging can be felt at the end of the leg. This is ideal for applications such as legged locomotion, where motors regularly apply large positive and then negative torques. With appropriate design, cable drives can handle very high torques as well as shock loads. Some notable drawbacks for cable drives, which have limited their wide adoption, include significant compliance due to cable stretch under load, limited speed reduction (gear ratio), and large size when used as a replacement for a gearbox. In our application, the inherent compliance is not a drawback, and is in fact augmented by additional compliance from the fiberglass springs.

As an alternative or as a complement to the cable drive, a cycloid transmission may be used. When paired with a cable drive, the limited speed reduction of the cable drive is addressed by the transmission ratio of the cycloid. The cable drive can serve to implement leg linkage relationships and transmit power from the motor/cycloid modules to the legs. A cycloid drive is a good choice for this application because it may have very low backlash, high torque density (capacity compared to mass), and high efficiency, implemented by combining multiple loading points with total rolling contact. Cycloid performance is nearly constant over the range of output torque, unlike harmonic drives which reach peak efficiency only at 100% rated torque. Backlash in cycloids can asymptotically approach zero through precise machining technology, such as wire EDM Manufacturing, which also lends itself to the lobed cycloid gear profile. While past cycloid designs have been limited by circular machine tool profiles, new manufacturing techniques suggest new cycloid designs are possible, given appropriate experimentation and investigation. Cycloid transmissions may be co-located with motors, or located separately with a belt or other method to transmit power between the motor and cycloid transmission.

Linear actuators may also be used, such as a ball screw or a lead screw connected to an electric motor; a twisted string actuator, where a motor twists two strings together to pull on a joint; or linear motors. Hydraulic cylinders may be utilized as linear actuators, or pneumatic cylinders. With any form of linear actuator, one end of the cylinder will be connected to one frame (such as the body 100), and the other end will be connected to the other frame (such as pulley 152), either directly or through some linkage or transmission. Hydraulic or pneumatic actuators may also have rotational variants, which could be used in the present invention.

In addition, in FIGS. 1 and 2, the transmissions are shown as cables 172, 176, between motors 162, 164 and pulleys 152, 154 as well as between the pulleys 152, 154 themselves. Linkages are shown connecting leg links 122-128 and springs 142, 144 to the links 122-128. These are representative examples, but many forms of transmission can be used to implement the same function. For example, the motors 162, 164 (as drawn) may include any rotational actuator (electric or otherwise) paired with a speed-reducing and torque-amplifying transmission such as a harmonic drive, planetary gearbox, or cycloid transmission. The cables 172, 176 (as drawn) may be a high-speed cable drive, as show in FIGS. 4-7. The cables may include a threaded smaller pulley on which the cable wraps, and a much larger paired pulley on which the cable also wraps. The smaller pulley makes multiple revolutions for every revolution of the larger pulley, thus reducing the speed and increasing the torque. The cable material may be stranded stainless steel, Tungsten, a polymer such as Vectran® fiber, or any number of tensile, flexible materials. The transmission may also be implemented using a belt in place of a cable, or a linkage of solid pieces, or a gear train. The important aspect of cable and linkage transmissions is the functional relationship between the components that the transmission mandates: i.e., a cable between the pulleys drawn at a scale to show that the second pulley 154, 454 will rotate twice for each rotation of the first pulley 156, 456, because of their size difference.

This relationship may be imparted using many different types of transmission. For instance, the transmission relationship may be nonlinear, implemented using non-round pulleys or complex linkages. While the pulleys 152, 154, 452, 454 are shown to be round, the shape may be non-circular, engineered specifically to create a nonlinear positional relationship between the pulleys 152, 154, 452, 454.

As to the springs 442, 444, they have been illustrated and described as leaf springs made of fiberglass material that flexes under load, absorbing and returning energy to the system. The springs 142, 144, 442, 444 could alternatively be implemented with any suitable elastic material that stores mechanical energy, and used in a manner other than a leaf spring, such as a stretchy tendon or a torsional spring at a joint or incorporated as part of the transmission. Examples might include polymer materials used in woven bands such as shock cords; silicone or other polymer materials molded around tensile members in shapes allowing convenient tensioning, using additive manufacturing to create molds or parts of the structure; helical springs or torsion bar springs fabricated from metals; or fiberglass springs used torsionally. The springs may or may not follow the classic Hooke's law of "F=Kx," because different geometries and materials may include hysteresis (internal damping), or may follow a nonlinear function (such that the stiffness, K, is not constant throughout the deflection). It is likely that the preferred spring function will be softening over the deflection, and not linear.

The springs need not be placed in series with an individual actuator, so long as the combined behavior of the springs acts in series with the combined behavior of the motors. For two or more springs, there exists a "vector field" of spring function that describes its deflection as a function of applied force, in two or more directions rather than just a single direction. To create the desired passive dynamics for legged locomotion, it is necessary only to shape this vector field, using any combination of springs made up of any number of springs with any number of different stiffnesses or spring functions. Further, this spring function vector field can be modified through the use of linkages or transmission; it may also be the case that the linkage is designed for reasons other than spring function, and the individual spring functions must then be changed to compensate. For example, the leg described in FIG. 1 has springs on distal links to minimize the distal mass, and as a result, the springs deflect the leg link differently than the same action from the actuators. In FIG. 1, action of the rotating body 154 may result in point 127, the distal end of link 126, retracting directly along the line of the leg length. However, deflection of spring 144 will not, because it does not enforce a coordinated motion of link 122. To compensate, the spring function of 144 and 142 may be balanced through individual adjustment to their stiffness or stiffness function, such that the result of a force applied at 127 in the direction of leg length will lead to a deflection in the same direction. Many methods exist to adjust spring stiffness and function, including but not limited to shaping the fiberglass plate spring by tapering its width or thickness along its length.

It should therefore be understood that this invention is not limited to the particular embodiments described herein, but is intended to include all changes and modifications that are within the scope and spirit of the invention as set forth in the claims.

What is claimed is:

1. A robot for legged locomotion, comprising:
    a body;
    a leg having first, second, and third links, with the first and second links pivotally mounted to one another and with the second and third links pivotally mounted to one another, the first link having opposing first and second ends with the first end pivotally mounted to the body;
    a first actuator mounted at the body and configured to rotate the first link about the first end of the first link;
    a second actuator mounted at the first link and configured to rotate the second link relative to the first link, wherein the first and second actuators are operable to swing the leg and extend/retract the leg along a leg length direction; and
    a first leg spring disposed in series between the first link and the third link, and a second leg spring operably connected in series between the second actuator and the second link, the leg springs configured to store energy therein during a first portion of a stance and configured to recover the stored energy during a second portion of the stance to provide passive dynamics for locomotion.

2. The robot of claim 1, comprising a gimbal actuator operably connected between the first link and the body.

3. The robot of claim 2, wherein at least one of the first actuator, second actuator, and gimbal actuator includes a cycloid transmission.

4. The robot of claim 2, wherein at least one of the first actuator, second actuator, and gimbal actuator includes a motor.

5. The robot of claim 1, comprising two gimbal actuators operably connected between the first link and the body, the gimbal actuators each having an axis of rotation which axes are not oriented parallel to one another.

6. The robot of claim 1, comprising two gimbal actuators operably connected between the first link and the body, the gimbal actuators each having an axis of rotation which axes are oriented perpendicular to one another.

7. The robot of claim 6, wherein the axes of the two gimbal actuators are each oriented orthogonal to an axis of rotation of the first actuator.

8. The robot of claim 1, comprising a first rotational element mounted at the body, the first actuator and rotational element operably connected such that the first actuator is configured to rotate the first rotational element to rotate the first link about the first end of the first link.

9. The robot of claim 8, comprising a second rotational element mounted at the first link, the second actuator and second rotational element operably connected such that the second actuator is configured to rotate the second rotational element to rotate the second link relative to the first link.

10. The robot of claim 9, comprising a cable pulley transmission operably connected between at least one of: (a) the first rotational element and the first actuator, and (b) the second rotational element and the second actuator.

11. The robot of claim 9, comprising a cycloid transmission operably connected between at least one of: (a) the first rotational element and the first actuator, and (b) the second rotational element and the second actuator.

12. The robot of claim 9, wherein the second leg spring is disposed in series between the second link and the second rotational element.

13. The robot of claim 9, comprising a transmission operably connected between the first and second rotational elements, the transmission configured to transmit rotational movement of the first rotational element to the second rotational element.

14. The robot of claim 9, wherein the second rotational element is disposed between the first and second links and attaches the first link to the second link.

15. The robot of claim 9, wherein the second rotational element is mounted at the second end of the first link.

16. The robot of claim 9, wherein the first rotational element is disposed between the body and first link and attaches the first link to the body.

17. The robot of claim 9, wherein the first rotational element is mounted at the body.

18. The robot of claim 1, wherein the first actuator is configured to rotate an angle of the leg.

19. The robot of claim 1, wherein the second actuator is configured to control the leg length of the leg.

20. The robot of claim 1, wherein the leg includes a transmission disposed between the first link and the third link.

21. The robot of claim 20, wherein the transmission includes a link.

22. The robot of claim 1, wherein the second and third links have respective longitudinal axes, and the second and/or third links are rotatable about their respective longitudinal axes to provide yaw and adduction/abduction of the leg.

23. The robot of claim 1, comprising a transmission operably connected between the first and third links, the transmission configured to transmit rotational movement of the first link to the third link.

* * * * *